(12) United States Patent
Yamamura et al.

(10) Patent No.: US 10,675,535 B2
(45) Date of Patent: Jun. 9, 2020

(54) COMPUTER-READABLE NON-TRANSITORY STORAGE MEDIUM HAVING STORED THEREIN INFORMATION PROCESSING PROGRAM, INFORMATION PROCESSING APPARATUS, INFORMATION PROCESSING SYSTEM, AND INFORMATION PROCESSING METHOD

(71) Applicant: NINTENDO CO., LTD., Kyoto (JP)

(72) Inventors: Tomohiro Yamamura, Kyoto (JP); Tomomi Sano, Kyoto (JP); Hiroyuki Takahashi, Tokyo (JP); Shugo Takahashi, Tokyo (JP)

(73) Assignee: NINTENDO CO., LTD., Kyoto (JP)

( * ) Notice: Subject to any disclaimer, the term of this patent is extended or adjusted under 35 U.S.C. 154(b) by 575 days.

(21) Appl. No.: 14/667,947

(22) Filed: Mar. 25, 2015

(65) Prior Publication Data
US 2015/0319266 A1 Nov. 5, 2015

(30) Foreign Application Priority Data

Apr. 30, 2014 (JP) .................................. 2014-093854

(51) Int. Cl.
*H04L 29/08* (2006.01)
*A63F 13/30* (2014.01)
*A63F 13/60* (2014.01)

(52) U.S. Cl.
CPC .............. *A63F 13/30* (2014.09); *A63F 13/60* (2014.09); *H04L 67/02* (2013.01); *H04L 67/10* (2013.01);
(Continued)

(58) Field of Classification Search
CPC ......... H04L 67/10; H04L 67/32; H04L 67/02; A63F 13/30; A63F 13/60; A63F 2300/204; G06F 3/0482; G06F 3/04847
(Continued)

(56) References Cited

U.S. PATENT DOCUMENTS 8,566,175 B1 * 10/2013 Nguyen .............. G06Q 30/0635
705/26.41
8,920,243 B1 * 12/2014 Curtis ..................... A63F 13/61
463/40
(Continued)

FOREIGN PATENT DOCUMENTS

JP    2000148607    5/2000
JP    2005-242874   9/2005
(Continued)

OTHER PUBLICATIONS

Lawrence Abrams, "How to install Software Updates on your Mac" Aug. 7, 2012, URL: https://www.bleepingcomputer.com/tutorials/how-to-install-software-updated-on-your-mac/.*
(Continued)

*Primary Examiner* — Tonia L Dollinger
*Assistant Examiner* — Schquita D Goodwin
(74) *Attorney, Agent, or Firm* — Nixon & Vanderhye, P.C.

(57) ABSTRACT

After presentation target information for presenting information of a predetermined content to a user has been newly received from a predetermined server, a first notification that urges the user to check the newly-arrived presentation target information is displayed. Thereafter, while the presentation target information has not yet been checked, a second notification that urges the user to check the unchecked presentation target information is displayed periodically or according to a predetermined time schedule. The presenta-
(Continued)

tion target information is displayed when an operation to check the presentation target information is performed to the first notification or the second notification has been performed.

24 Claims, 15 Drawing Sheets

(52) U.S. Cl.
CPC ........ *H04L 67/32* (2013.01); *A63F 2300/204* (2013.01)

(58) Field of Classification Search
USPC .......................................................... 709/219
See application file for complete search history.

(56) References Cited

U.S. PATENT DOCUMENTS

| | | | | |
|---|---|---|---|---|
| 9,592,444 | B2* | 3/2017 | Knutsson | G07F 17/32 |
| 2004/0187103 | A1* | 9/2004 | Wickham | G06F 8/65 |
| | | | | 717/168 |
| 2006/0173975 | A1* | 8/2006 | Nose | G06F 8/65 |
| | | | | 709/219 |
| 2009/0094107 | A1* | 4/2009 | Torkelson | G06Q 30/02 |
| | | | | 705/14.47 |
| 2009/0276334 | A1 | 11/2009 | Hosoda et al. | |
| 2009/0299817 | A1* | 12/2009 | Fok | G06F 17/30867 |
| | | | | 705/14.64 |
| 2012/0252574 | A1* | 10/2012 | Chow | H04L 67/38 |
| | | | | 463/31 |
| 2013/0132235 | A1* | 5/2013 | Gandhi | G06Q 30/0601 |
| | | | | 705/26.41 |
| 2013/0227607 | A1* | 8/2013 | Saltonstall | H04N 21/458 |
| | | | | 725/35 |
| 2013/0297583 | A1* | 11/2013 | Yu | G06F 16/951 |
| | | | | 707/706 |
| 2014/0025521 | A1* | 1/2014 | Alsina | G06Q 30/0601 |
| | | | | 705/26.1 |
| 2014/0026048 | A1* | 1/2014 | Spirer | G06F 3/0484 |
| | | | | 715/716 |
| 2014/0087883 | A1* | 3/2014 | Lee | A63F 13/12 |
| | | | | 463/42 |
| 2014/0089068 | A1* | 3/2014 | Yehezkel | G06Q 30/02 |
| | | | | 705/14.19 |
| 2014/0106878 | A1* | 4/2014 | Knutsson | G07F 17/32 |
| | | | | 463/31 |
| 2014/0122329 | A1* | 5/2014 | Naggar | G06Q 20/3552 |
| | | | | 705/41 |
| 2015/0058140 | A1* | 2/2015 | Dixon | G06O 30/0277 |
| | | | | 705/14.73 |
| 2015/0111643 | A1* | 4/2015 | Olofsson | A63F 13/335 |
| | | | | 463/31 |
| 2015/0143281 | A1* | 5/2015 | Mehta | G06Q 10/10 |
| | | | | 715/781 |
| 2015/0287102 | A1* | 10/2015 | Gupta | G06Q 30/0257 |
| | | | | 705/14.73 |
| 2016/0162940 | A1* | 6/2016 | Kang | G06Q 30/0255 |
| | | | | 705/14.53 |

FOREIGN PATENT DOCUMENTS

| | | |
|---|---|---|
| JP | 2006094421 | 4/2006 |
| JP | 2011238023 | 11/2011 |
| WO | 2007122962 | 1/2007 |

OTHER PUBLICATIONS

William Pearson, "Hide Software Updates from the App Store in Mac OS X" Sep. 27, 2012, URL: http://osxdaily.com/2012/09/27/hide-software-updates-mac-app-store-os-x/.*
Ronen Halevy, "BlackBerry Link Desktop Software for BlackBerry 10 Review" Jan. 30, 2013, URL: http://www.berryreview.com/2013/01/30/blackberry-link-desktop-software-for-blackberry-10-review-pc-mac/.*
Brian Burgess, "Enable the Reminder Bell in Outlook 2010," Sep. 30, 2010, retrieved via: https://www.howtogeek.com/howto/30326/enable-the-reminder-bell-in-outlook-2010/ (Year: 2010).*
Trevor Sheridan, "Mountain Lion: Software Update Moves to the Mac App Store," Jul. 27, 2012, retrieved via: http://applenapps.com/mac_news/mountain-lion-software-update-moves-to-the-mac-app-store.html#.WpjrpTN95EY (Year: 2012).*
Chad Sapieha, "Candy Crush Saga: Why you play and why you pay," Jul. 30, 2013, Retrieved via: https://business.financialpost.com/technology/gaming/candy-crush-saga-why-you-play-and-why-you-pay (Year: 2013).*
Urban Airship, "Go Beyond Push Notifications to Engage Your Entire Audience with In-App Content," Jul. 10, 2013, Retrieved via: https://www.urbanairship.com/blog/go-beyond-push-notifications-to-engage-your-entire-audience-with-in-app-content (Year: 2013).*
NIX Solutions, "In App Purchase Tutorial," Sep. 21, 2010, Retrieved via: https://www.nixsolutions.com/blog/development/iphone/in-app-purchase-tutorial/ (Year: 2010).*
Deidra Bowen, Candy Crush Saga on Facebook review, 2:34-2:44, Retrieved via URL: https://www.youtube.com/watch?v=AbH8Givg6XM (Year: 2012).*

* cited by examiner

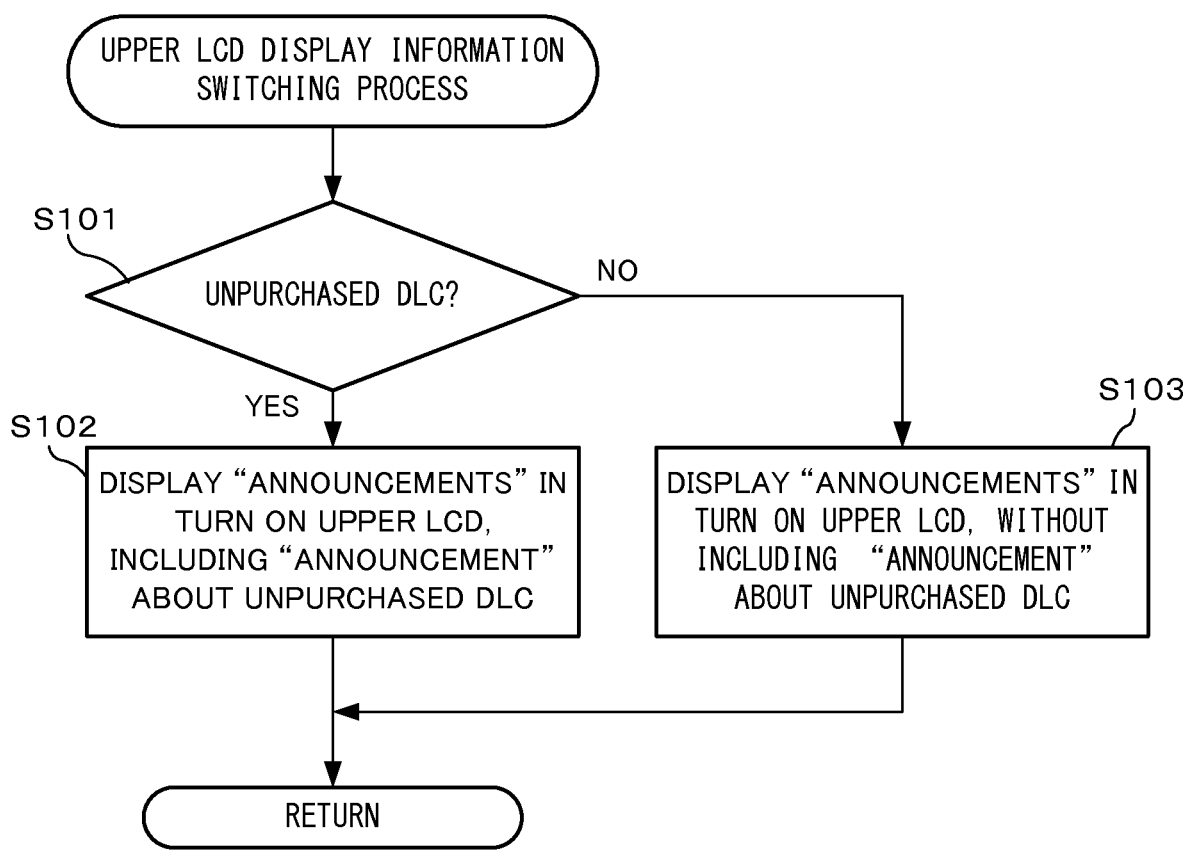

COMPUTER-READABLE NON-TRANSITORY STORAGE MEDIUM HAVING STORED THEREIN INFORMATION PROCESSING PROGRAM, INFORMATION PROCESSING APPARATUS, INFORMATION PROCESSING SYSTEM, AND INFORMATION PROCESSING METHOD

CROSS REFERENCE TO RELATED APPLICATION

The disclosure of Japanese Patent Application No. 2014-093854, filed on Apr. 30, 2014, is incorporated herein by reference.

FIELD

The exemplary embodiments relate to a computer-readable non-transitory storage medium having stored therein an information processing program to be executed by a computer of an information processing apparatus which notifies information distributed from a predetermined server, and the like.

BACKGROUND AND SUMMARY

Conventionally, an information distribution system has been known in which, when an information distribution server has a newly arrived distributable content, the URL of the content and notification indicating that the content is distributable are transmitted to user terminals.

In the above system, however, depending on the time to notify the newly arrived distribution information, there is a possibility that a user does not view the information.

Therefore, it is an object of the exemplary embodiments to provide a computer-readable non-transitory storage medium having stored therein an information processing program, an information processing apparatus, an information processing system, and an information processing method which are able to effectively perform notification of newly arrived distribution information or the like to users.

In order to attain the feature described above, for example, the following configuration examples are exemplified.

A configuration example is a computer-readable non-transitory storage medium having stored therein an information processing program executed by a computer of an information processing apparatus which notifies information distributed from a predetermined server. The information processing program causes the computer to operate as a receiving section, a first notification section, a second notification section, and a presentation target information display section. The receiving section receives, from the predetermined server, presentation target information for presenting information of a predetermined content to a user. The first notification section, after new presentation target information has been received, displays a first notification that urges the user to check the new presentation target information. The second notification section displays a second notification that urges the user to check the presentation target information, periodically or according to a predetermined time schedule, while the presentation target information has not yet been checked by the user after display of the first notification has been performed by the first notification section. The presentation target information display section displays the presentation target information when an operation to check the presentation target information is performed to the first notification or the second notification. Examples of the computer-readable non-transitory storage medium include magnetic media such as a flash memory, a ROM, and a RAM, and optical media such as a CD-ROM, a DVD-ROM, and a DVD-RAM.

According to the above configuration example, newly-arrived distribution information can be effectively notified to the user.

In another configuration example, the first notification section may display the first notification in a display mode in which advance of processing being executed is impeded, and the second notification section also may display the second notification in a display mode in which advance of processing being executed is impeded. As an example, the first notification and the second notification may be displayed so as to be superimposed on a screen content relating to software processing being executed. As another example, the first notification section may continuously display the first notification until receiving a predetermined input operation from the user to the first notification, and delete the first notification when receiving the predetermined input operation from the user. The second notification section may continuously display the second notification until receiving a predetermined input operation from the user to the second notification, and delete the second notification when receiving the predetermined input operation from the user. That is, notification that requests a user operation to the notification may be displayed. As still another example, a processing section may be provided which does not advance other processing until an input operation to the first notification is performed, while the first notification section displays the first notification. That is, the processing section may not advance processing other than the processing relating to notification. Further, the display positions of the first notification and the second notification may be substantially in the center of the screen.

According to the above configuration example, the user can be induced to check the presentation target information, and thus the content of the presentation target information can be reliably notified to the user.

In another configuration example, the presentation target information may be information for explaining, in detail, a predetermined content that is purchasable. The program may cause the computer to further operate as a purchase processing section which, subsequently to the process of displaying the presentation target information by the presentation target information display section, displays a screen for purchase of the purchasable content, and executes a process for purchase of the content based on a user operation.

According to the above configuration example, a user who has checked the presentation target information and become interested in the content of the information can be induced to the purchase screen, whereby the user is saved from the trouble of, for example, searching for the purchase screen.

In another configuration example, the information processing program may cause the computer to further operate as a third notification section which displays, on a screen, a third notification indicating that a predetermined process based on a user operation is possible to the predetermined content corresponding to the presentation target information. The third notification section may display the third notification after the presentation target information display section displays the presentation target information. That is, the third notification section may display the third notification after the presentation target information has been checked.

For example, the third notification is notification indicating that a process or the like for acquiring (e.g., purchasing) the content is possible.

According to the above configuration example, when a pay content has not yet been purchased or a free content has not yet been acquired, it is possible to notify the user of the fact and cause the user to pay attention to the content.

In another configuration example, the third notification section may display the third notification in a display mode in which advance of processing being executed is not impeded. As an example, the third notification section may display the third notification in a display mode in which user's viewability for a display content other than the third notification in the screen is not impeded. Further, the third notification may be notification that does not need an input operation of the user to the notification. Further, the information processing program may cause the computer to further operate as a processing section which executes processing so that the user is allowed to perform an operation even when the third notification section displays the third notification.

According to the above configuration example, the notification can be performed so as not to disturb the user, and so as not to reduce the operability of the user.

In another configuration example, the presentation target information is information for explaining, in detail, the predetermined content that is purchasable, and the third notification may be displayed while the predetermined content has not been purchased, and may not be displayed after the predetermined content has been purchased.

According to the above configuration example, the user is notified that the content has not yet been purchased, thereby to prevent the user from forgetting to purchase the content.

Another configuration example is an information processing program executed by a computer of an information processing apparatus which notifies information distributed from a predetermined server. The information processing program causes the computer to operate as a receiving section, a first notification section, a presentation target information display section, a purchase determination section, and a second notification section. The receiving section receives, from the predetermined server, presentation target information for presenting information of a predetermined content to a user. The first notification section, after new presentation target information has been received, notifies the user of the new presentation target information. The purchase determination section, after notification by the first notification section has been performed, determines whether or not the content has been purchased. The second notification section, when the content has not yet been purchased, notifies that the content is purchasable.

According to the above configuration example, for example, when a new download content has been released, commodity explanation thereof can be checked by a user. Further, when the content has not yet been purchased, it is possible to notify the user of the fact and prevent the user from forgetting to purchase the content.

In another configuration example, the second notification section may notify that the content is purchasable, in a display mode in which advance of processing being executed is not impeded. For example, the second notification section may perform the notification in a display mode in which user' viewability for a display content, in a screen, other than the notification about the purchasable content is not impeded. Further, the second notification section may perform the notification while the content has not yet been purchased, and may not perform the notification after the content has been purchased.

According to the above configuration example, the user is prevented from forgetting to purchase the content while convenience to the user is not degraded.

According to the exemplary embodiment, it is possible to effectively notify the user of information newly distributed from the predetermined server.

BRIEF DESCRIPTION OF THE DRAWINGS

FIG. 20 is a flowchart showing, in detail, an upper-LCD information switching process in step S16 shown in FIG. 14.

DETAILED DESCRIPTION OF NON-LIMITING EXAMPLE EMBODIMENTS

Hereinafter, an exemplary embodiment will be described. In the exemplary embodiment, a hand-held game apparatus will be described as an example of an information processing apparatus. Golf game processing will be described as an example of information processing executed in the hand-held game apparatus.

(Configuration of Hand-Held Game Apparatus)

Figure 1:
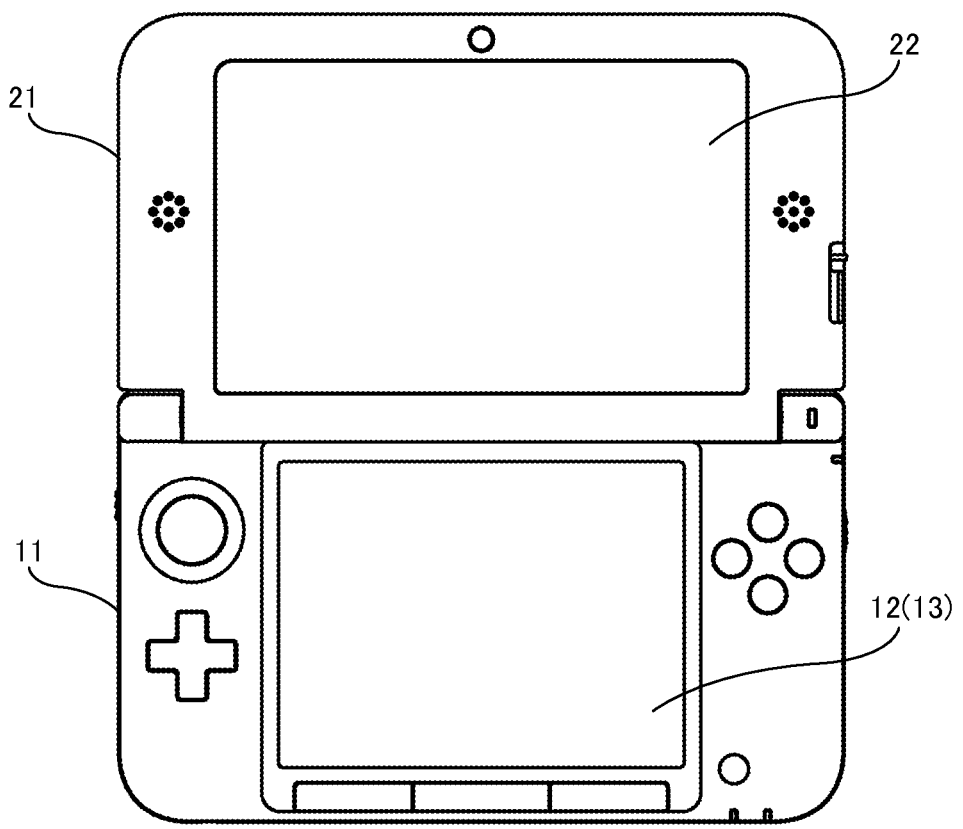
FIG. 1 is an external view showing a hand-held game apparatus 10 according to an exemplary embodiment.

FIG. 1 is a diagram showing an external view of a hand-held game apparatus 10 according to the exemplary embodiment. As shown in FIG. 1, the hand-held game apparatus 10 includes a lower housing 11 and an upper housing 21. The lower housing 11 and the upper housing 21 are connected to each other so as to be openable and closable (foldable). Unusually, a user uses the game apparatus 10 in the opened state. When not using the game apparatus 10, the user keeps the game apparatus 10 in the closed state. A lower LCD (Liquid Crystal Display: liquid crystal display device) 12 and a touch panel 13 are provided in the lower housing 11. In addition, in the lower housing 11, operation buttons, an analog stick, and the like are also provided. Meanwhile, an upper LCD (Liquid Crystal Display: liquid crystal display device) 22 is provided in the upper housing 21.

Figure 2:
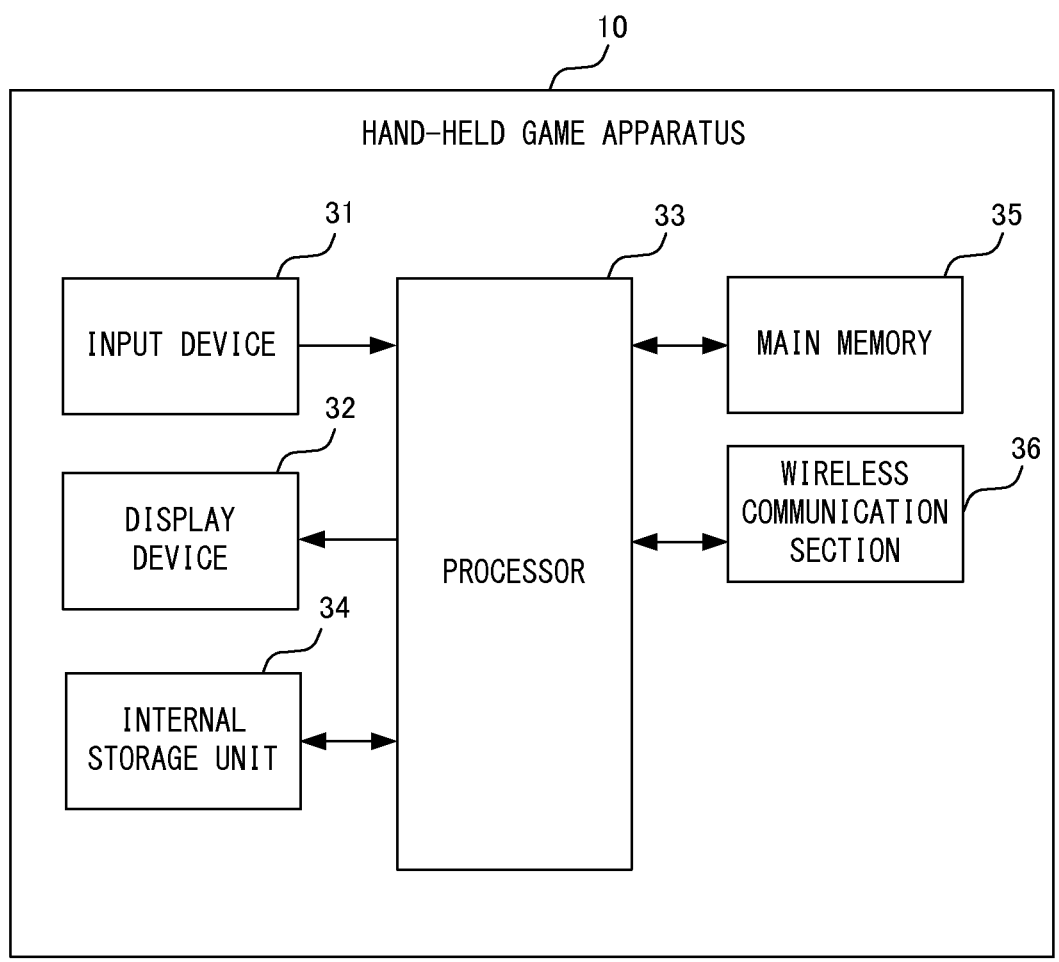
FIG. 2 is a block diagram showing an example of a configuration of the hand-held game apparatus 10.

FIG. 2 is a function block diagram showing the hand-held game apparatus 10. In FIG. 2, the hand-held game apparatus 10 includes an input device 31, a display device 32, a processor 33, an internal storage unit 34, a main memory 35, and a wireless communication section 36.

The input device 31 corresponds to the operation buttons and the touch panel 13 described above. The input device 31 is operated by a user of the hand-held game apparatus 10, and outputs a signal according to the operation performed by the user. The display device 32 displays, on a screen, an image generated by the hand-held game apparatus 10. The display device 32 is the lower LCD 12 and the upper LCD 22 described above. In the internal storage unit 34, a computer program to be executed by the processor 33 and various kinds of data to be used in the program are stored. In the exemplary embodiment, data received by the wireless communication section 36 is also stored in the internal storage unit 34. The internal storage unit 34 is typically implemented as a flash EEPROM. The main memory 35 temporarily stores computer programs and information. The wireless communication device 36 transmits and receives data to and from another hand-held game apparatus or a predetermined server, based on wireless communication (communication using the Internet, ad hoc communication, or the like).

Regarding the processor 33, later-described processing may be executed by a single processor 33 (single core processor or the like), or may be executed by a plurality of processors 33 mounted in a single hand-held game apparatus 10 (including not only a case of a multi-CPU but also a case of a multi-core processor) so that the processing is divided to be performed by the plurality of processors 33.

Next, an operation outline of information processing executed the information processing system according to the exemplary embodiment (information processing executed by each hand-held game 10) will be described. The processing according to the exemplary embodiment is processing for notifying a user of information relating to so-called download contents (hereinafter referred to as DLC), and further, inducing the user to check the information.

In the exemplary embodiment, golf game processing is assumed as described above. This golf game corresponds to a network, and the user can purchase a DLC by communicating with a predetermined server. In addition, the user can, for example, compete with another user via the network. A case where an additional course, character, or the like is newly released as a DLC is assumed. The user can purchase the DLC at a "shop" (described later) provided in the golf game. In the exemplary embodiment, information for introducing (making a presentation of) the content of the DLC in detail is also provided. For example, when the DLC is a new golf course, the information is a moving picture that introduces the content of the course. When the DLC is an "item" useful in the game, the information corresponds to a moving picture showing an effect or the like obtained when the item is actually used, or a moving picture in which a predetermined character introduces (makes a presentation of) the effect or the like of the item (so-called commodity explanation). Of course, the information is not limited to such moving pictures. For example, the information may be composed of only characters and a static image. Hereinafter, the information will be referred to as "DLC presentation".

In the exemplary embodiment, processes described later are executed so as to induce a user to view the "DLC presentation" as much as possible. This is based on a consideration that, although whether or not the user (finally) purchases the DLC depends on the user's will, the user should know, before purchase, what the DLC is like (and thereafter, whether to purchase the DLC is left to the user's determination). For example, a case where an item that is advantageous for the user is newly released as a DLC is assumed. Then, if information of this item is left unrecognized by the user who will purchase the item if he/she knows the presence of the item, the seller of the item misses the chance of selling the item while the user misses the chance of advantageously advancing the game. Therefore, the information is not notification just notifying that the DLC has been released, but notification which, when these is an unchecked "DLC presentation", actively urges (induces) the user to check the "DLC presentation" so that the user knows the content of the DLC.

Hereinafter, the outline of the processing of the exemplary embodiment will be described with reference to examples of screens shown in FIGS. 3 to 11. In the exemplary embodiment, for convenience of explanation, the description will be given of a case where the number of newly released DLCs is only one (it is needless to say that a plurality of DLCs may be released in another embodiment).

Figure 3:
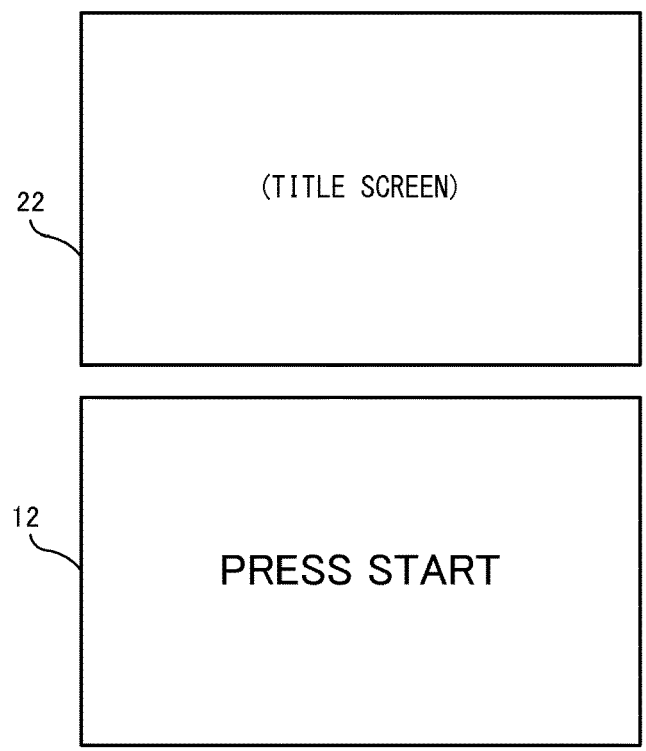
FIG. 3 shows an example of a screen according to the exemplary embodiment.

FIG. 3 shows a title screen displayed when the golf game according to the exemplary embodiment is started up. A user is allowed to start the golf game by pressing a predetermined button or touching the touch panel 13.

It is assumed that the hand-held game apparatus 10 is able to receive information indicating that the new DLC is released, in advance of the start-up of the golf game. This information is distributed from a predetermined server, and the hand-held game apparatus 10 can receive the information by communicating with the server at predetermined time intervals while the hand-held game apparatus 10 is in the sleep state, for example. Depending on whether or not the information (hereinafter referred to as newly arrived DLC information) has been received when the golf game is started up, the screen to be displayed or the like varies. Regarding the information distributed from the server, besides the newly arrived DLC information, other information relating to the golf game such as "announcement" of an even being held (e.g., a tournament) is distributed.

Figure 4:
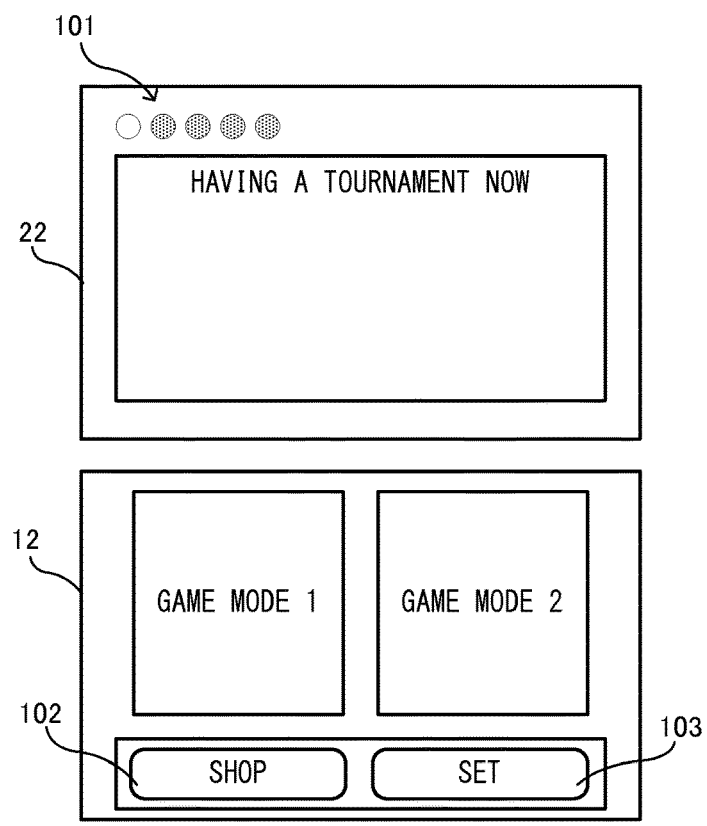
FIG. 4 shows an example of a screen according to the exemplary embodiment.

First, in the case where the hand-held game apparatus 10 has not received the newly arrived DLC information, when the user starts the game from the title screen, a main menu (which may be referred to as a "top menu") screen as shown in FIG. 4 is displayed. In this main menu screen, a screen indicating the information (e.g., the above-described event being held) distributed from the server is displayed on the upper LCD 22. In the main menu screen, the upper LCD 22 is mainly used for display of various kinds of "announcements". In an upper portion of the upper LCD 22, a plurality of icons 101 (hereinafter referred to as "announcement icons") are displayed side by side. There are "announcements" as many as the number of the announcement icons 101 (five in the example of FIG. 4), and the contents of the announcements are periodically switched to be displayed on the upper LCD 22 (the display may be switched according to a predetermined operation performed by the user). The announcement icon 101 corresponding to the currently displayed "announcement" is displayed in a mode different from that of other icons (for example, the ion is lit or not lit).

On the other hand, a screen which allows the user to select a game mode (e.g., a button indicating a single play mode or a competing mode) in the golf game is displayed on the lower LCD 12. When the user selects any game mode by performing a touch operation or the like, the user is allowed to play the golf game in the selected mode. In a lower portion of the screen, a "shop" button 102 and a "set" button 103 are also displayed. The user is allowed to display a later-described "shop" screen by performing a touch operation on the "shop" button 102, and is allowed to view a "DLC presentation" or purchase a DLC by performing an operation on the shop screen.

Next, a description will be given of a case where the hand-held game apparatus 10 has already received the newly arrived DLC information in advance of the start-up of the golf game according to the exemplary embodiment. For convenience of explanation, the following four cases are provided:

(1) a case where the golf game is started up for the first time after the newly arrived DLC information has been received;

(2) a case where the golf game is started up for the second or subsequent time after the newly arrived DLC information has been received, and the user has neither viewed the "DLC presentation" nor purchased the DLC;

(3) a case where the golf game is started up for the second or subsequent time after the newly arrived DLC information has been received, and the user has viewed the "DLC presentation" but has not yet purchased the DLC; and (4) a case where the golf game is started up for the second or subsequent time after the newly arrived DLC information has been received, and the user has already viewed the "DLC presentation" and purchased the DLC.

Regarding purchase of the DLC, if the user has never viewed the "DLC presentation", the user cannot purchase the DLC without viewing the "DLC presentation" of the DLC. Specifically, unless a process to present the "DLC presentation" is performed, the screen for purchase of the DLC is not displayed. In other words, in the exemplary embodiment, once the user has viewed the (not-yet-viewed) "DLC presentation", the user is induced to the purchase screen.

Figure 5:
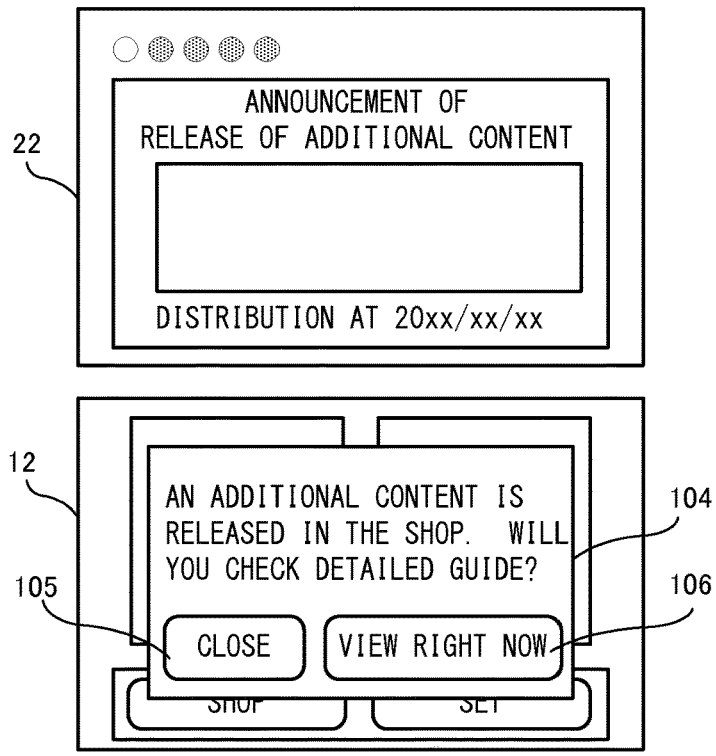
FIG. 5 shows an example of a screen according to the exemplary embodiment.
Figure 6:
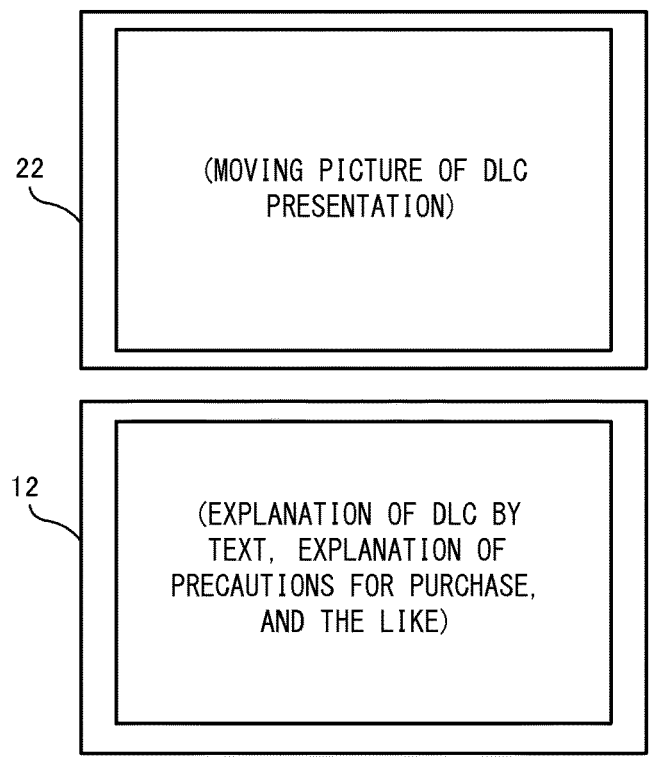
FIG. 6 shows an example of a screen according to the exemplary embodiment.

First, (1) the case where the golf game is started up for the first time after the newly arrived DLC information has been received will be described. In this case, when the golf game is started from the title screen, a screen as shown in FIG. 5 is displayed. In FIG. 5, on the upper LCD 22, an "announcement" (hereinafter referred to as an "announcement of additional DLC") indicating that an additional DLC has been released (indicating that there is a purchasable DLC) is displayed. Meanwhile, on the lower LCD 12, a dialog box 104 is displayed in a substantially center portion of the screen so as to be superimposed on the main menu (in other words, so as to be superimposed on the screen relating to the software process being currently executed). The dialog box 104 represents a message indicating that the new DLC has been released, and urging the user to check the details of the new DLC (to view the DLC presentation). On the dialog box 104, a "close" button 105 and a "view right now" button 106 are provided. The dialog box 104 is continuously displayed unless either the "close" button 105 or the "view right now" button 106 is selected by the user. That is, unless the user returns a response to the dialog box 104, the golf game processing is not advanced (in principle, other operations are not accepted). In other words, at this point in time, the user needs to indicate his/her intention as to whether to view the "DLC presentation". In the following description, the dialog box 104 displayed at this time is referred to as a "first-notification dialog".

On the first-notification dialog 104, if the user selects (by an touch operation or the like) the "view right now" button 106 (that is, if the user indicates his/her intention to view the "DLC presentation"), a predetermined screen is displayed, and a process to present the "DLC presentation" is started. It is assumed that a moving picture for introducing the content of the DLC information is played as the "DLC presentation" on the upper LCD 22, while explanation of the DLC content, precautions for purchase, and the like are displayed as character information on the lower LCD 12 (refer to FIG. 6). When playback of the moving picture is ended, the screen for purchase of the DLC is automatically displayed. Alternatively, for example, a "to purchase screen" button or the like may be displayed on the lower LCD 12, and the screen for purchase may be displayed when the user touches the button. Then, based on a user operation performed on the screen for purchase, communication with the predetermined server is performed, and a DLC purchase process (including a settlement process or the like) is executed. Of course, the user may close the screen for purchase without purchasing the DLC. When the screen for purchase is closed, the main menu is displayed. As described later, the display content of the main menu slightly varies depending on whether or not the user has purchased the DLC (display/non-display of a non-purchase mark 110 described later).

Figure 7:
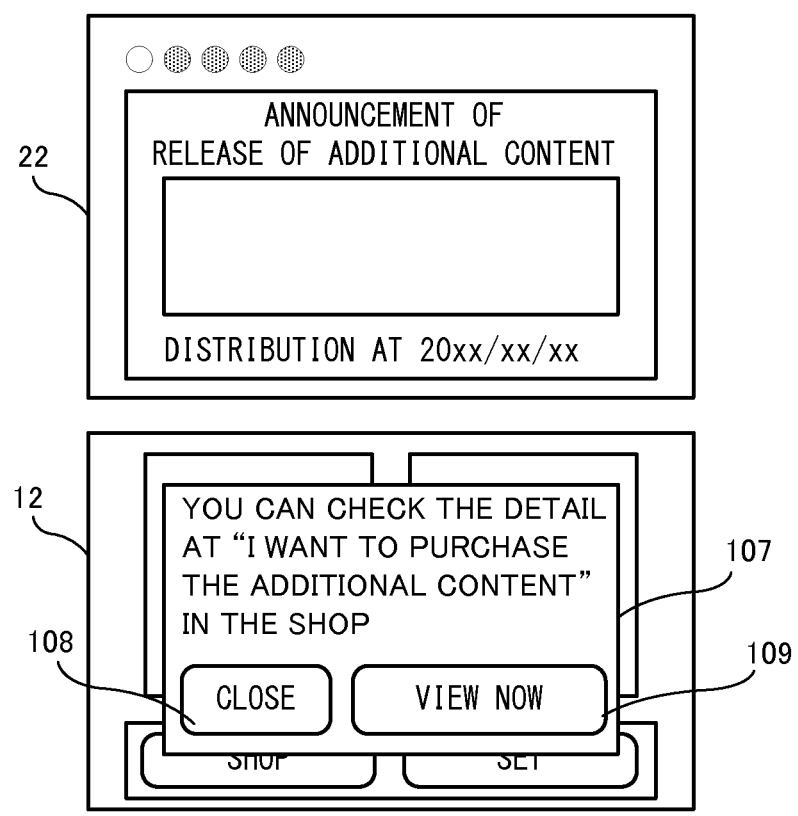
FIG. 7 shows an example of a screen according to the exemplary embodiment.

On the other hand, if the user selects the "close" button 105 on the first-notification dialog 104 (that is, when the user indicates his/her intention not to view the "DLC presentation" at this point in time), a screen as shown in FIG. 7 is displayed. In this screen, a dialog box 107 is displayed on the lower LCD 12. Display of the dialog box 107 also has a meaning of "reconfirmation" for the user's intention. In the following description, the dialog box 107 is referred to as a "reconfirmation dialog". On the reconfirmation dialog 107, a message indicating where (in the game) the user can check the "DLC presentation" is shown. In addition, on the reconfirmation dialog 107, a "close" button 108 and a "view now" button 109 are provided. If the user selects the "view now" button 109, the above-described process to present the "DLC presentation" is started.

Figure 8:
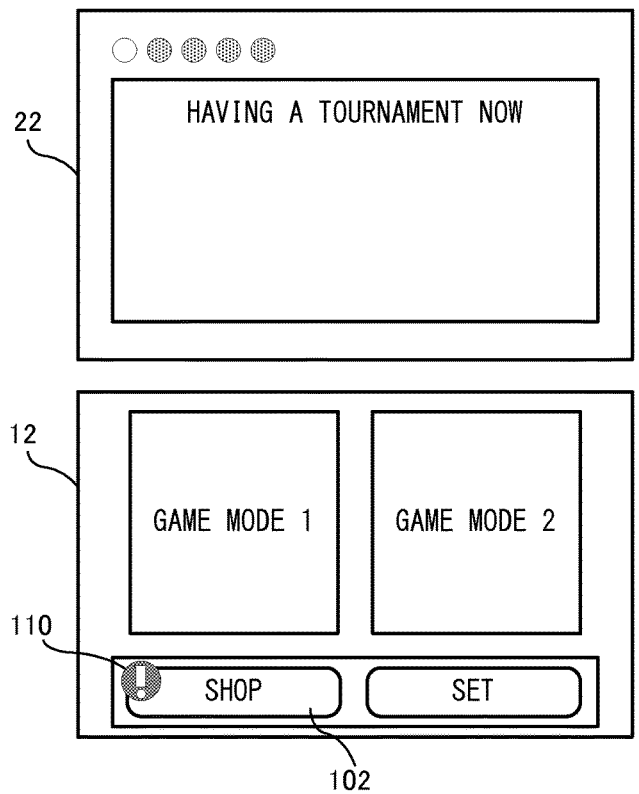
FIG. 8 shows an example of a screen according to the exemplary embodiment.

On the other hand, if the user selects the "close" button 108 on the reconfirmation dialog 107, the reconfirmation dialog 107 is deleted, and a main menu screen as shown in FIG. 8 is displayed. In FIG. 8, a mark 110 is imparted to an upper-left portion of the "shop" button 102 in the main menu. The mark 110 notifies the user that there is a purchasable DLC. That is, the purpose of the mark 110 is to let the user know the presence of the purchasable DLC, because the state where the user has not yet viewed the "DLC presentation" is the state where the user has not yet purchased the DLC. In addition, the mark 110 is presented to an extent that does not make the user feel uncomfortable. In the following description, the mark 110 is referred to as a "non-purchase mark". The non-purchase mark 110 may be displayed as a "moving mark" by using animation. In this case, the non-purchase mark 110 is "moved" so that the motion appeals the presence of the mark 110 but does not make the user feel uncomfortable.

Figure 9:
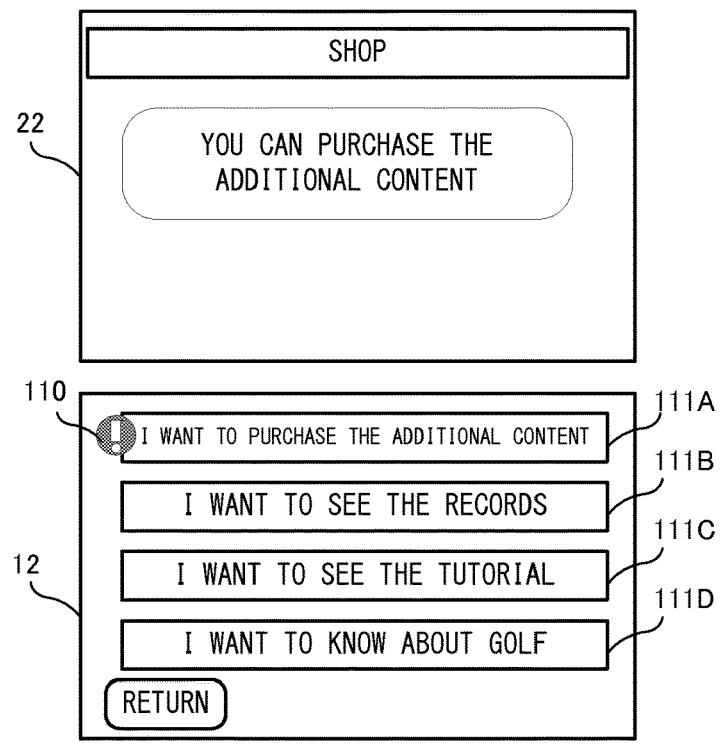
FIG. 9 shows an example of a screen according to the exemplary embodiment.

Hereinafter, a description will be given of the screen and the operation in the case where the user selects the "shop" button 102. In this case, the screen is switched to the shop screen. FIG. 9 shows an example of the shop screen. In FIG. 9, explanation of the shop and the like are displayed on the upper LCD 22. Four buttons 111A to 111D are displayed as a shop menu on the lower LCD 12. Of these buttons, the first (top) button 111A corresponds to an item regarding the DLC. When there is an unpurchased DLC, the above-described purchase mark 110 is imparted to the button 111A. When the button 111A is selected, the above-described process to present the "DLC presentation" is started, and thereafter, the screen is switched to the purchase screen as described above. If the "DLC presentation" has been viewed even once, the screen may be switched to the purchase screen with the process to present the "DLC presentation" being skipped. Alternatively, the "DLC presentation" may be again presented, but playback of the "DLC presentation" may be canceled in the middle to proceed to the purchase screen. On the other hand, if any of the other buttons 111B to 111D is selected, a process corresponding to the selected button is appropriately executed.

Figure 10:
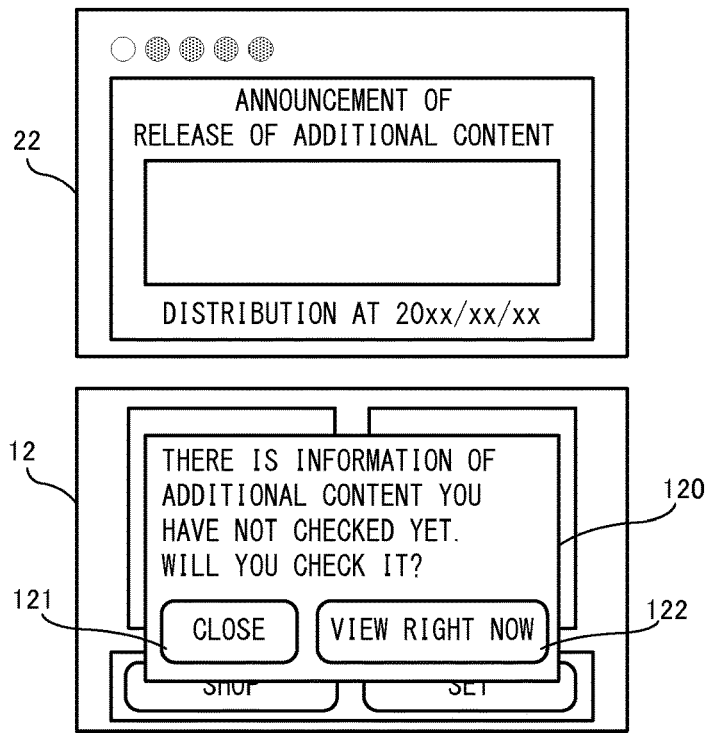
FIG. 10 shows an example of a screen according to the exemplary embodiment.
Figure 11:
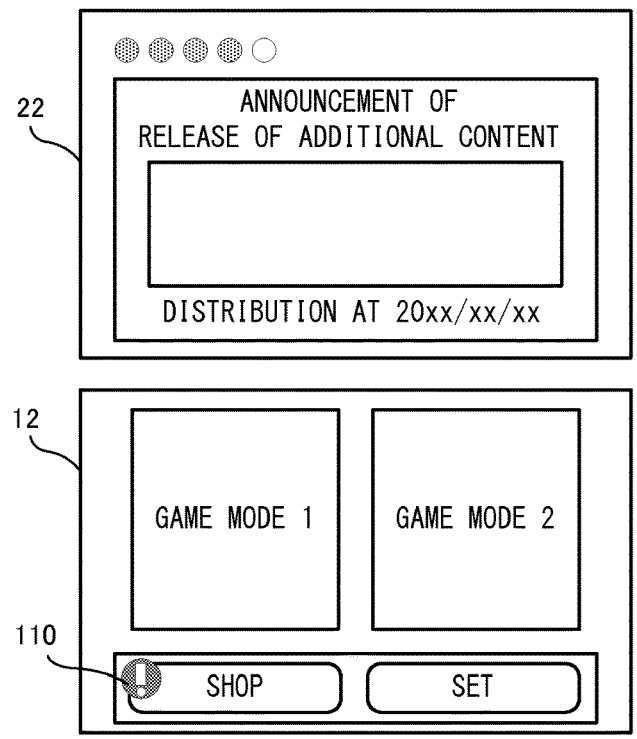
FIG. 11 shows an example of a screen according to the exemplary embodiment.

Next, a description will be given of (2) the case where the golf game is started up for the second or subsequent time after the newly arrived DLC information has been received, and the user has neither viewed the "DLC presentation" nor purchased the DLC. In this case, when the golf game is started from the title screen, basically the main menu (with the non-purchase mark 110) as shown in FIG. 8 is displayed. However, a screen as shown in FIG. 10 is displayed at the time when the golf game is started from the title screen, periodically or at predetermined time intervals (e.g., once a week). In FIG. 10, the above-described "announcement of additional DLC" is displayed on the upper LCD 22. On the lower LCD 12, a dialog box 120 is displayed so as to be superimposed on the main menu. On the dialog box 120, a message indicating that there is a not-yet-viewed "DLC presentation". In addition, like the first-notification dialog 104, a "close" button 121 and a "view right now" button 122 are provided on the dialog box 120. That is, in the state where the "DLC presentation" has not yet been viewed by the user, the dialog box 120 that urges the use to view the "DLC presentation" is displayed at the time when the golf game is started, periodically or at predetermined time intervals. In the following description, the dialog box 120 is referred to as a "periodic reminder dialog". When the "view right now" button 122 is selected on the periodic reminder dialog 120, the process of presenting the "DLC presentation" is started like in the case of the first-notification dialog 104. On the other hand, when the "close" button 121 is selected, the periodic reminder dialog 120 is deleted, and the main menu (with the non-purchase mark 110) is displayed.

Next, a description will be given of (3) the case where the golf game is started up for the second or subsequent time after the newly arrived DLC information has been received, and the user has viewed the "DLC presentation" but has not yet purchased the DLC. In this case, when the golf game is started from the title screen, the main menu with the non-purchase mark 110 as shown in FIG. 8 is displayed. That is, in this case, the user is allowed to operate the main menu as soon as the golf game is started from the title screen. Since the "DLC presentation" has already been viewed, the periodic reminder dialog 120 is not displayed. On the other hand, since the DLC has not yet been purchased, the "announcement of additional DLC" is displayed on the upper LCD 22. As described above, on the main menu screen, the plurality of "announcements" are automatically switched to be displayed on the upper LCD 22. The "announcement of additional DLC" is included in the "announcements", and is periodically displayed on the upper LCD 22 (refer to FIG. 11). Regarding the display on the upper LCD 22, while the first-notification dialog 104 or the periodic reminder dialog 120 is being displayed, the display content on the upper LCD 22 is fixed to the "announcement of additional DLC".

Next, a description will be given of (4) the case where the golf game is started up for the second or subsequent time after the newly arrived DLC information has been received, and the user has already viewed the "DLC presentation" and purchased the DLC. Also in this case, when the golf game is started from the title screen, the main menu shown in FIG. 4 is displayed, and the user is immediately allowed to operate the main menu. The non-purchase mark 110 is not displayed. The "announcement of additional DLC" is not included in the "announcements" displayed on the upper LCD 22.

As described above, in the exemplary embodiment, when a new DLC has been released (when notification thereof has been received), the first-notification dialog 104 is presented so as to urge the user to view the "DLC presentation". While the "DLC presentation" is not yet confirmed by the user, the periodic reminder dialog 120 is further presented periodically or at predetermined time intervals. These dialogs are presentations that request the user operation to indicate his/her intention, and the user cannot advance the golf game processing unless he/she performs any operation on these dialogs to indicate his/her intention (in that sense, these dialogs are presentations with strong appeal to the user). In other words, the first-notification dialog 104, the reconfirmation dialog 107, and the periodic reminder dialog 120 are each displayed in a display mode that impedes the advance of the process being executed at that time.

Further, while the DLC has not yet been purchased, the non-purchase mark 110 is displayed, and the "announcement of additional DLC" is displayed on the upper LCD 22. In contrast to the above dialogs, these displays do not request the user operation to indicate his/her intention (do not impede the advance of the process being executed). The purpose of these displays is a little different from that of the above dialogs. That is, while the purpose of the dialogs is mainly to urge (induce) the user to check the DLC presentation, the purpose of the displays is to notify the user of the presence of the purchasable DLC (in that sense, the displays are presentations with less appeal as compared to the dialogs). By using such gradual notification, it is possible to effectively notify the user of the presence of the DLC. For example, whether or not to purchase the DLC is left to the free will of the user, but at least commodity explanation of the DLC is reliably notified to the user (the user is let to know the detail of the DLC).

Next, the operation of the hand-held game apparatus 10 in the exemplary embodiment will be described in more detail with reference to FIGS. 12 to 20.

Figure 12:
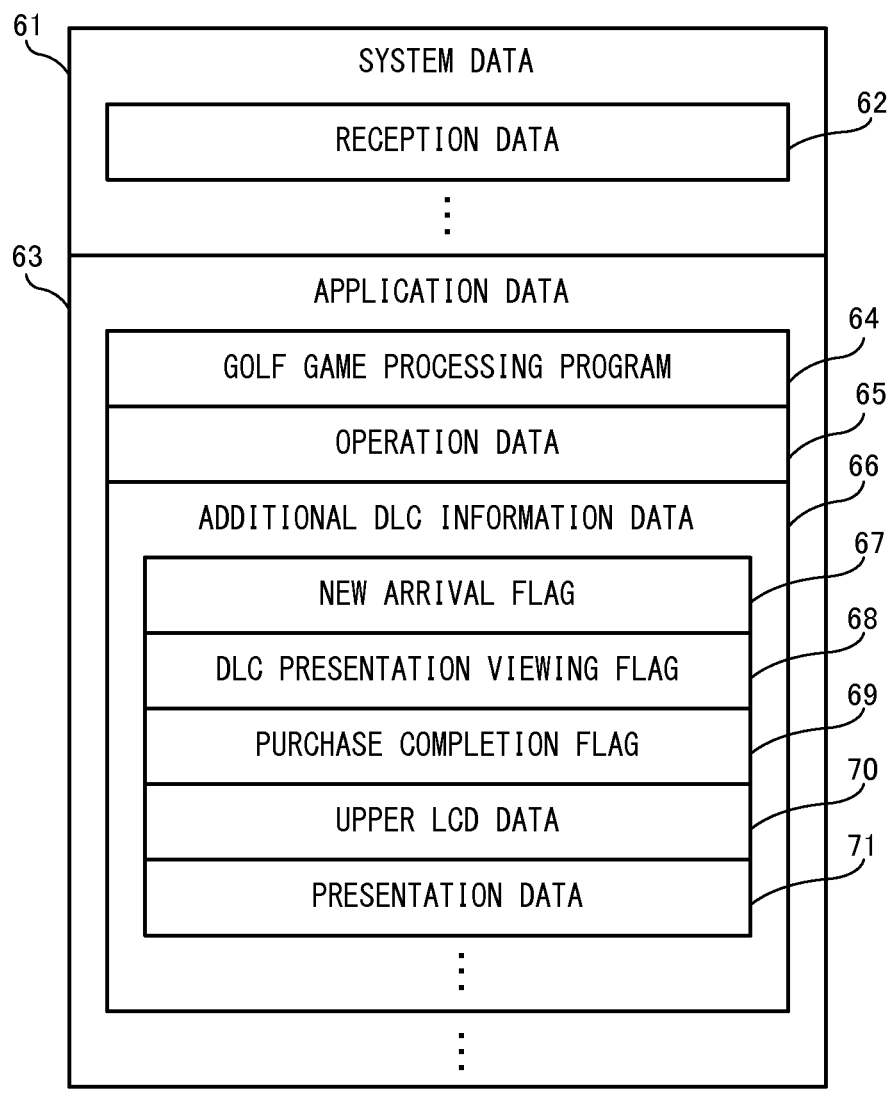
FIG. 12 shows examples of a program and information stored in a main memory 15 of the hand-held game apparatus 10.

First, a program and various data used in the information processing according to the exemplary embodiment will be described. FIG. 12 shows examples of a program and data stored in the internal storage unit 34 and the main memory 35 of the hand-held game apparatus 10. The data used in the exemplary embodiment is roughly divided into system data 61 and application data 63. The system data 61 is data mainly used by a system (OS or the like) of the hand-held game apparatus 10. The application data 63 is data mainly used in the golf game processing as described above.

The system data 61 includes reception data 62 and the like. The reception data 62 is data relating to an "announcement" received from a predetermined server while the hand-held game apparatus 10 is in the sleep state, such as the above-described newly arrived DLC information. The reception data 62 is stored in the internal storage unit 34, and is loaded to the main memory 35 according to need. In the exemplary embodiment, when the golf game processing is started, the newly arrived DLC information is read from the reception data 62, and is copied as a part of the application data 63 (additional DLC information data 66 described later), or new data is created based on the newly arrived DLC information. The reception data 62 that has once been read (copied) in the golf game processing or the like is deleted.

The application data 63 is various data mainly used for executing the golf game processing, and is basically stored in the internal storage unit 34. When the golf game processing is executed, the application data 63 is loaded to the main memory 35 and executed according to need. The application data 63 includes a golf game processing program 64, operation data 65, additional DLC information data 66, and the like.

The golf game processing program 64 is a program for executing a process to induce the user to view DLC presentation as described above. Specifically, the golf game processing program 64 is a program for executing the flowchart shown in FIGS. 13 to 14.

The operation data 65 is data indicating various operations performed to the hand-held game apparatus 10. That is, the operation data 65 is data indicating the pressed states of the various buttons, touch coordinates of the touch panel 13, and the like.

The additional DLC information data 66 is data relating to a DLC, and includes a new arrival flag 67, a DLC presentation viewing flag 68, a purchase completion flag 69, upper LCD data 70, presentation data 71, and the like. The new arrival flag 67 is a flag indicating whether or not the above-described processing has been performed even once for the DLC relating to the data. In other words, the new arrival flag 67 is a flag indicating whether or not the process of presenting the first-notification dialog 104 has been performed. A value indicating that the process of presenting the first-notification dialog 104 has not yet been performed (flag-off) is set as an initial value.

The DLC presentation viewing flag 68 is a flag indicating whether or not the "DLC presentation" has been viewed. A value indicating that the "DLC presentation" has not yet been viewed (flag-off) is set as an initial value.

The purchase completion flag 69 is a flag indicating whether or not the DLC has been purchased (at least once). A value indicating that the DLC has not yet been purchased (flag-off) is set as an initial value.

The upper LCD data 70 is data (text and/or image data) for displaying an "announcement" relating to the DLC (the above-described "announcement of additional DLC") on the upper LCD 22. The presentation data 71 is data of the "DLC presentation". The presentation data is stored in the game apparatus body in the exemplary embodiment. However, the presentation data may be stored in, for example, a predetermined server, and the game apparatus may communicate with the server in the process of presenting "DLC presentation" to receive the "DLC presentation" streaming-distributed from the server.

Although not shown in FIG. 12, the additional DLC information data 66 includes, according to need, data required for the processing of the exemplary embodiment, such as the date and time when the data was created.

Next, with reference to flowcharts shown in FIGS. 13 to 20, the flow of the golf game processing executed by the processor 33 of the hand-held game apparatus 10 will be described. Execution of the gold game processing according to the exemplary embodiment is started, for example, when an operation to start the golf game processing is performed on a home menu (not shown) of the hand-held game apparatus 10. The detailed description of the processes other than the presentation and notification of the various dialogs and the like as described above will be omitted.

Figure 13:
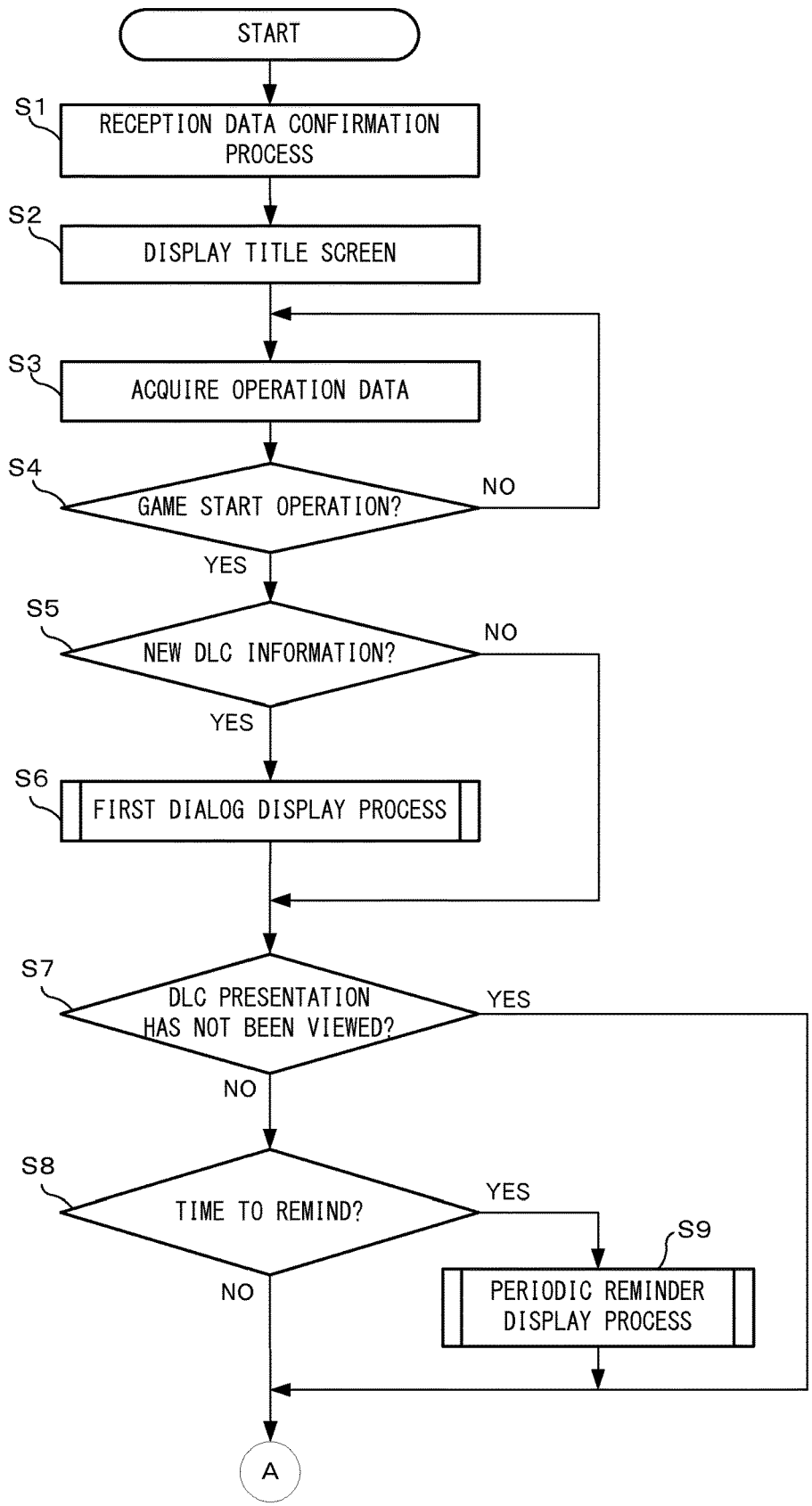
FIG. 13 is a flowchart showing, in detail, golf game processing according to the exemplary embodiment.

When the golf game processing is started, an initialization process for the various data and the like is performed, and thereafter, a reception data confirmation process is executed at step S1 in FIG. 13. In this process, with reference to the reception data 62, it is determined whether or not newly arrived DLC information has been received. When newly arrived DLC information has been received, the processor 33 copies the data thereof in the main memory 35 as additional DLC information data 66. At this time, as the initial value of the DLC presentation viewing flag 68, a value indicating that the DLC presentation has not yet been viewed is set. Further, as the initial value of the purchase completion flag 69, a value indicating that the DLC has not yet been purchased is set. When the copy is completed, the processor 33 deletes the reception data.

Next, in step S2, the processor 33 performs display of the title screen of the golf game. Subsequently, the processor 33 performs acquisition of the operation data 65 in step S3, and determines, in step S4, based on the operation data 65, whether or not a game start operation has been performed by a user. When the result of the determination is that the game start operation has not been performed (NO in step S4), the processor 33 returns to step S2 and repeats the processing.

On the other hand, if the game start operation has been performed (YES in step S4), the processor 33, in step S5, determines whether or not there is newly arrived DLC information which has been newly received this time. This determination is performed by referring to the new arrival flag 67. When the result of the determination is that newly arrived data has been received (YES in step S5), the processor 33 executes a first dialog display process in step S6. On the other hand, when newly arrived data has not been received (NO in step S5), the processor 33 skips this process and advances to a process of step S7 described later.

Figure 15:
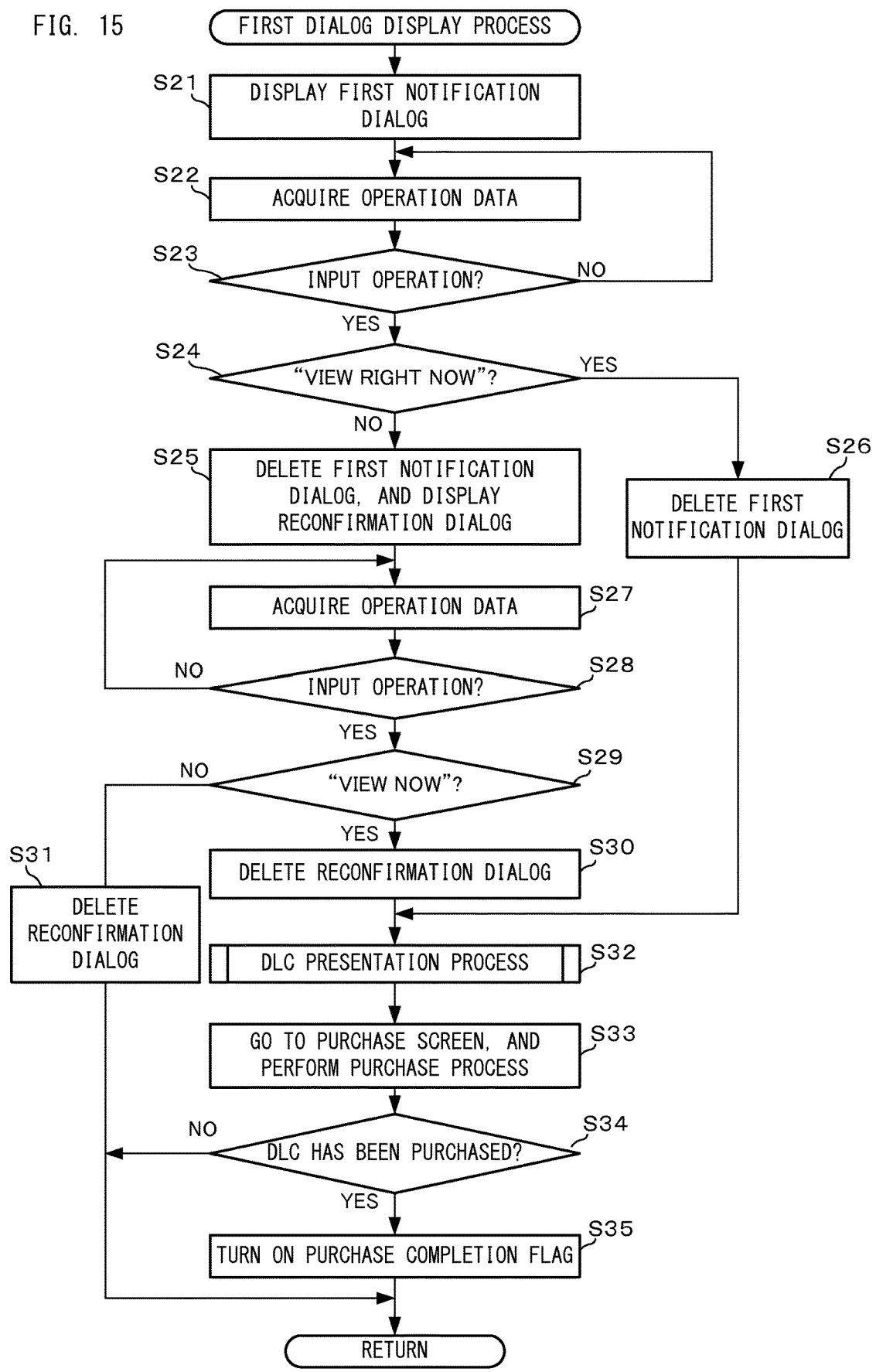
FIG. 15 is a flowchart showing, in detail, an initial dialog display process in step S6 shown in FIG. 13.

FIG. 15 is a flowchart showing the detail of the first dialog display process in step S6. In FIG. 15, first, in step S21, the processor 33 executes a process to display the first-notification dialog 104. That is, the processor 33 temporarily generates a main menu screen (refer to FIG. 4), and generates, as a screen displayed on the lower LCD 12, the main menu as shown in FIG. 4, and further generates a screen in which the first-notification dialog 104 as shown in FIG. 5 is superimposed on the main menu. In addition, the processor 33 generates, as a screen to be displayed on the upper LCD 22, the above-described "announcement of additional DLC", based on the upper LCD data 70. The processor 33 displays thus generated screens on the upper LCD 22 and the lower LCD 12.

Next, the processor 33 performs acquisition of the operation data 65 in step S22, and determines, in step S23, based on the operation data 65, whether or not an input operation has been performed by the user. When the result of the determination is that no input operation has been performed (NO in step S23), the processor 33 returns to step S22 and repeats the processing. On the other hand, when an input operation has been performed (YES in step S23), the processor 33 determines, in step S24, whether or not the content of the operation is selection of the "view right now" button 106. When the result of the determination is that the "view right now" button 106 has been selected (YES in step S24), the processor 33 deletes the first-notification dialog 104 in step S26. Then, the processor 33 advances to a process in step S32 described later. On the other hand, when the operation is not selection of the "view right now" button 106 (NO in step S24), it means that the "close" button 105 has been selected. At this time, in step S25, the processor 33 generates and displays the screen as shown in FIG. 7. That is, the processor 33 executes a process of deleting the first-notification dialog 104, and generating and displaying the reconfirmation dialog 107.

Next, the processor 33 performs acquisition of the operation data 65 in step S27, and determines, in step S28, based on the operation data 65, whether or not an input operation has been performed by the user. When the result of the determination is that no input operation has been performed (NO in step S28), the processor 33 returns to step S27 and repeats the processing. On the other hand, when an input operation has been performed (YES in step S28), the processor, in step S29, determines whether or not the content of the operation is selection of the "view now" button 109. When the result of the determination is that the operation is not selection of the "view now" button 109 (NO in step S29), it means that the "close" button 108 has been selected. In this case, the processor 33, in step S31, deletes the reconfirmation dialog 107 and ends the first dialog display process. On the other hand, when the "view now" button 109 has been selected (YES in step S29), the processor 33 deletes the reconfirmation dialog 107 in step S30. Then, in step S32, the processor 33 executes a DLC presentation process.

Figure 16:
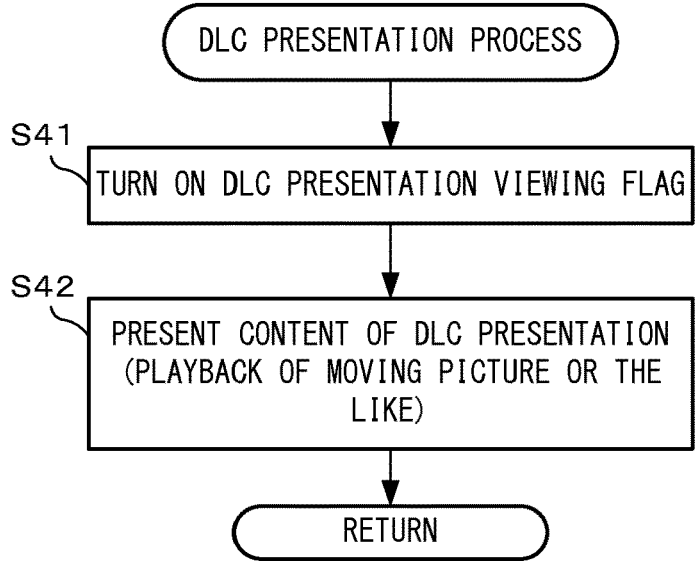
FIG. 16 is a flowchart showing, in detail, a DLC presentation process in step S32 shown in FIG. 15.

FIG. 16 is a flowchart showing the DLC presentation process in detail. In FIG. 16, the processor 33 turns on the DLC presentation viewing flag 68 in step S41. Next, in step S42, the processor 33 executes a process of presenting the "DLC presentation" (e.g., playback of a moving picture) based on the presentation data 71. In another embodiment, as described above, the processor 33 may communicate with a predetermined server to present the "DLC presentation" as a moving picture, in the mode of streaming distribution. This is the end of the DLC presentation process.

Referring back to FIG. 15, in step S33, the processor 33 displays a predetermined purchase screen, and executes a process relating to purchase of the DLC (purchase process). For example, a predetermined settlement, reflection the DLC in the game data, and the like are appropriately executed while communicating with the predetermined server. The purchase process may be ended without purchase of the DLC by the user.

When the purchase process has ended, in step S34, the processor 33 determines whether or not the user has purchased the DLC, based on the result of the purchase process. When the DLC has been purchased (YES in step S34), the processor 33 turns on the purchase completion flag 69 in step S35. This is the end of the first dialog display process. On the other hand, when the DLC has not yet been purchased (NO in step S34), the process in step S35 is not performed and the first dialog display process is ended.

Referring back to FIG. 13, when the first dialog display process has ended, the processor 33, in step S7, determines whether the "DLC presentation" has not been viewed or has been viewed (even once). This is determined based on the DLC presentation viewing flag 68. When the result of the determination is that the "DLC presentation" has been viewed (YES in step S7), the processor 33 advances to a process in step S10 described later. On the other hand, when the "DLC presentation" has not been viewed (NO in step S7), the processor 33, in step S8, determines whether or not the time to display the periodic reminder dialog 120 as shown in FIG. 10 has arrived. This is determined based on data indicating a predefined schedule, for example. In the case where the first-notification dialog 104 is displayed, display of the periodic reminder dialog 120 is not performed even when the time has arrived.

When the result of the determination is that the time to display the periodic reminder dialog 120 has not arrived (NO in step S8), the processor 33 advances to a process in step S10 described later. On the other hand, when the time has arrived (YES in step S8), the processor 33 executes a periodic reminder display process in step S9.

Figure 17:
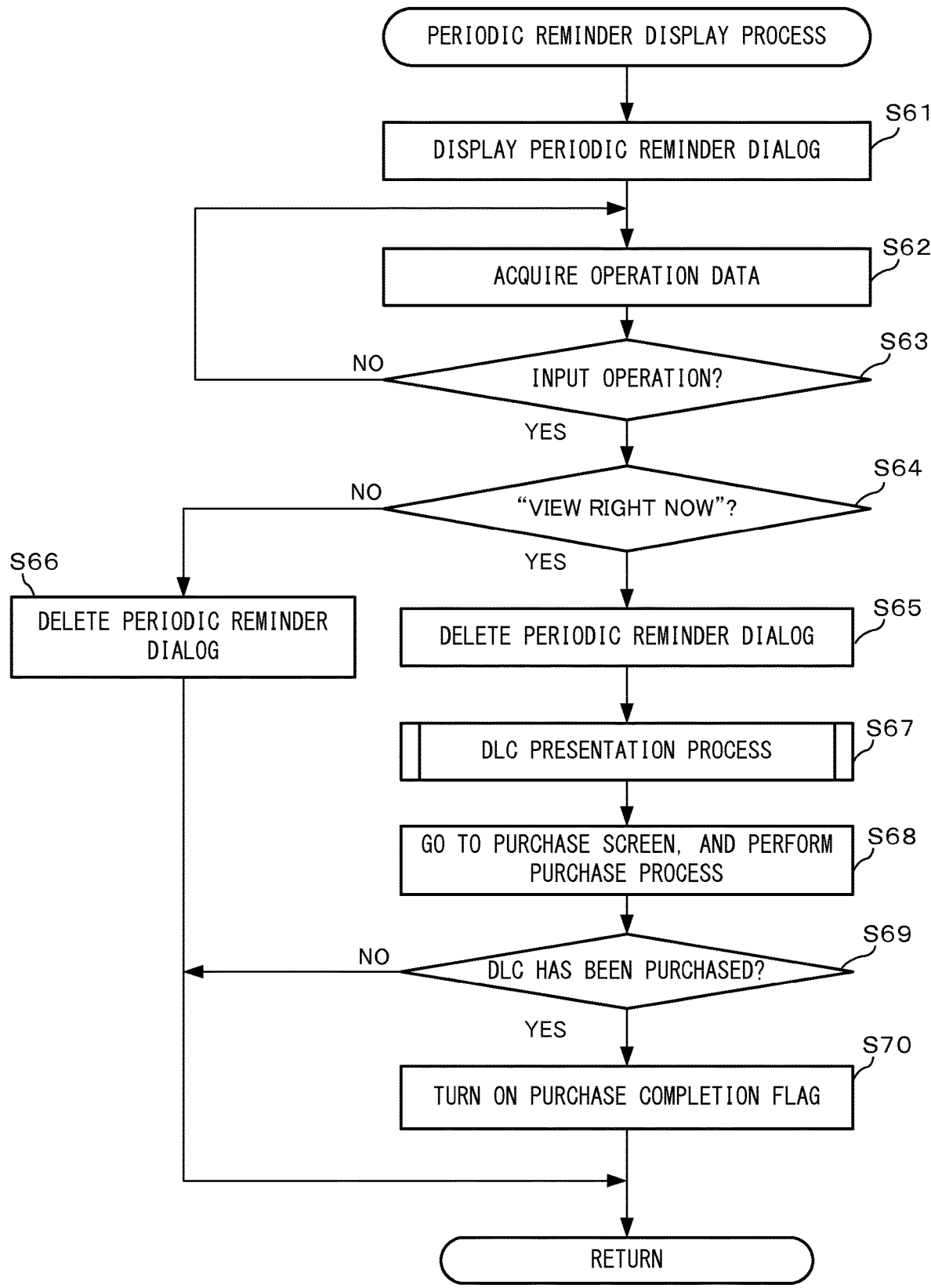
FIG. 17 is a flowchart showing, in detail, a periodic reminder display process in step S9 shown in FIG. 13.

FIG. 17 is a flowchart showing the periodic reminder display process according to step S9. In FIG. 17, first, the processor 33 displays the periodic reminder dialog 120 as shown in FIG. 10 in step S61.

Next, in step S62, the processor 33 performs acquisition of the operation data 65, and determines, in step S63, based on the operation data 65, whether or not an input operation has been performed by the user. When the result of the determination is that no input operation has been performed (NO in step S63), the processor 33 returns to step S62 and repeats the processing. On the other hand, when an input operation has been performed (YES in step S63), the processor 33, in step S64, determines whether or not the content of the operation is selection of the "view right now" button 122 (refer to FIG. 10). When the result of the determination is that the operation is not selection of the "view right now" button 122 (NO in step S64), it means that the "close" button 121 has been selected. At this time, the processor 33, in step S66, deletes the periodic reminder dialog 120 to end the periodic reminder display process.

On the other hand, when the "view right now" button 122 has been selected (YES in step S64), the processor 33 deletes the periodic reminder dialog 120 in step S65. Then, in step S67, the processor 33 executes the DLC presentation process described with reference to FIG. 16.

Next, in step S68, the processor 33 executes the same purchase process as in step S33. Then, in the following step S69, the processor 33 determines whether or not the DLC has been purchased. When the DLC has not been purchased (NO in step S69), the processor 33 ends the periodic reminder display process. On the other hand, when the DLC has been purchased (YES in step S69), the processor 33 turns on the purchase completion flag 69 in step S70. Thus, the periodic reminder display process is ended.

Figure 14:
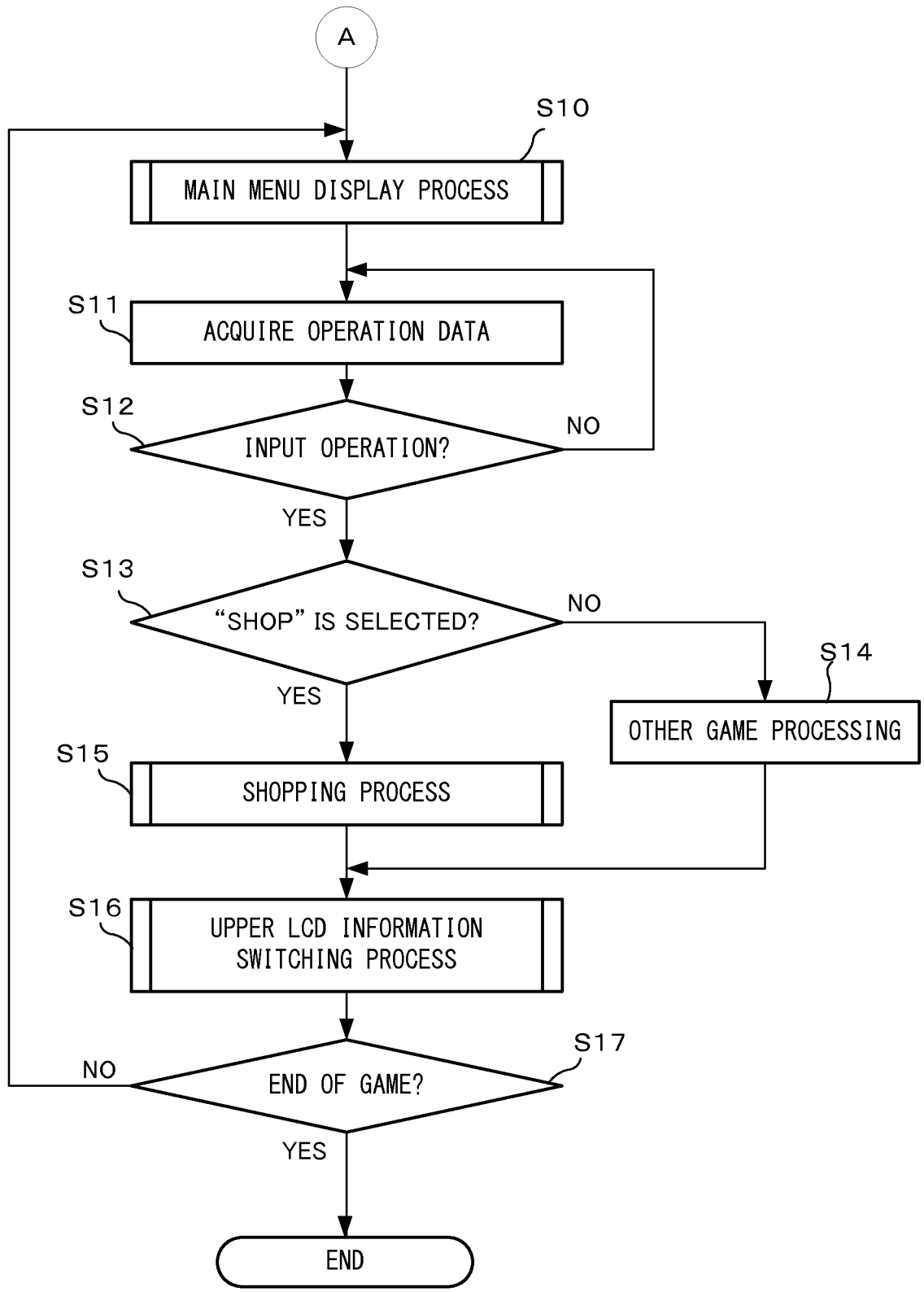
FIG. 14 is a flowchart showing, in detail, the golf game processing according to the exemplary embodiment.
Figure 18:
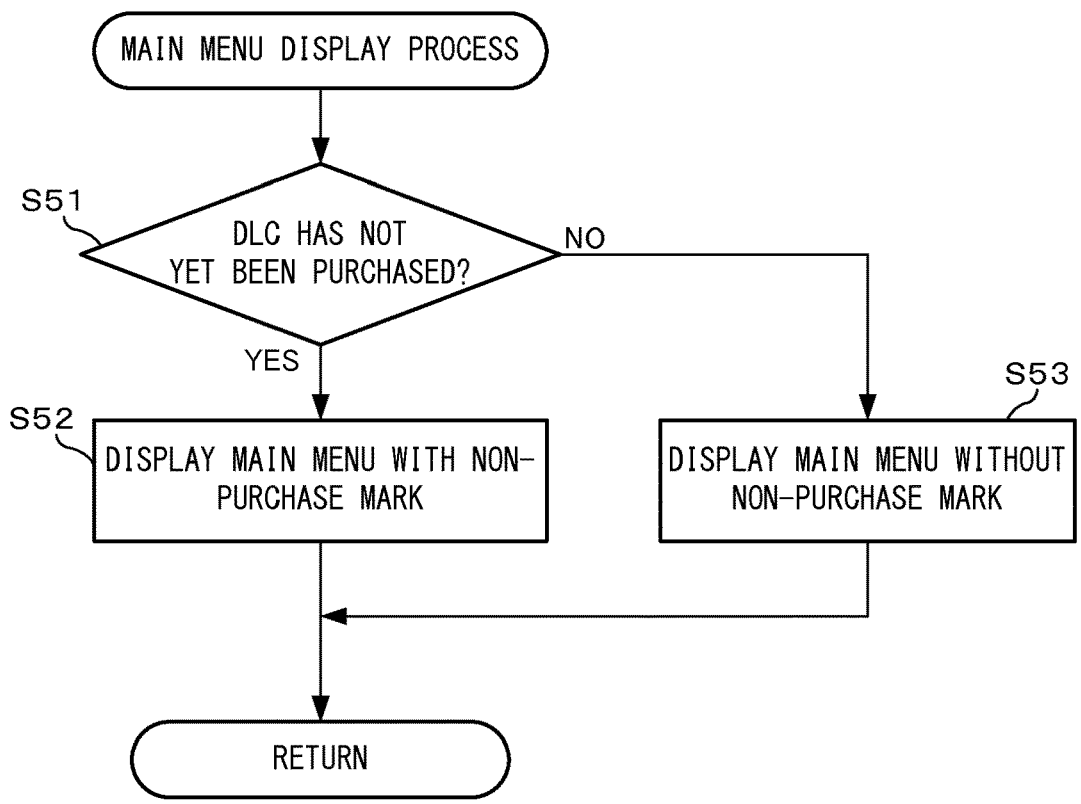
FIG. 18 is a flowchart showing, in detail, a periodic reminder display process in step S10 shown in FIG. 14.

Next, in step S10 shown in FIG. 14, the processor 33 executes a main menu display process. FIG. 18 is a flowchart showing the detail of the main menu display process. With reference to FIG. 18, the processor 33 determines, in step S51, based on the purchase completion flag 69, whether the DLC has not yet been purchased. When the result of the determination is that the DLC has not yet been purchased (YES in step S51), the processor 33, in step S52, displays the main menu including the non-purchase mark 110. On the other hand, when the DLC has been purchased (NO in step S51), the processor 33 displays the main menu having no non-purchase mark 110 in step S53. This is the end of the main menu display process.

Referring back to FIG. 14, the processor 33 performs acquisition of the operation data 65 in step S11, and determines, in step S12, based on the operation data 65, whether or not an input operation has been performed by the user.

When the result of the determination is that no input operation has been performed (NO in step S12), the processor 33 returns to step S11 and repeats the processing. On the other hand, when an input operation has been performed (YES in step S12), the processor 33, in step S13, determines whether or not the content of the operation is selection of the "shop" button 102 (refer to FIG. 4). When the result of the determination is that the operation is not selection of the "shop" button 102 (NO in step S13), the processor 33, in step S14, appropriately executes various game processing according to the operation content. Then, the processor 33 advances to a process of step S16 described later. On the other hand, when the "shop" button 102 has been selected (YES in step S13), the processor 33 executes a shopping process in step S15.

Figure 19:
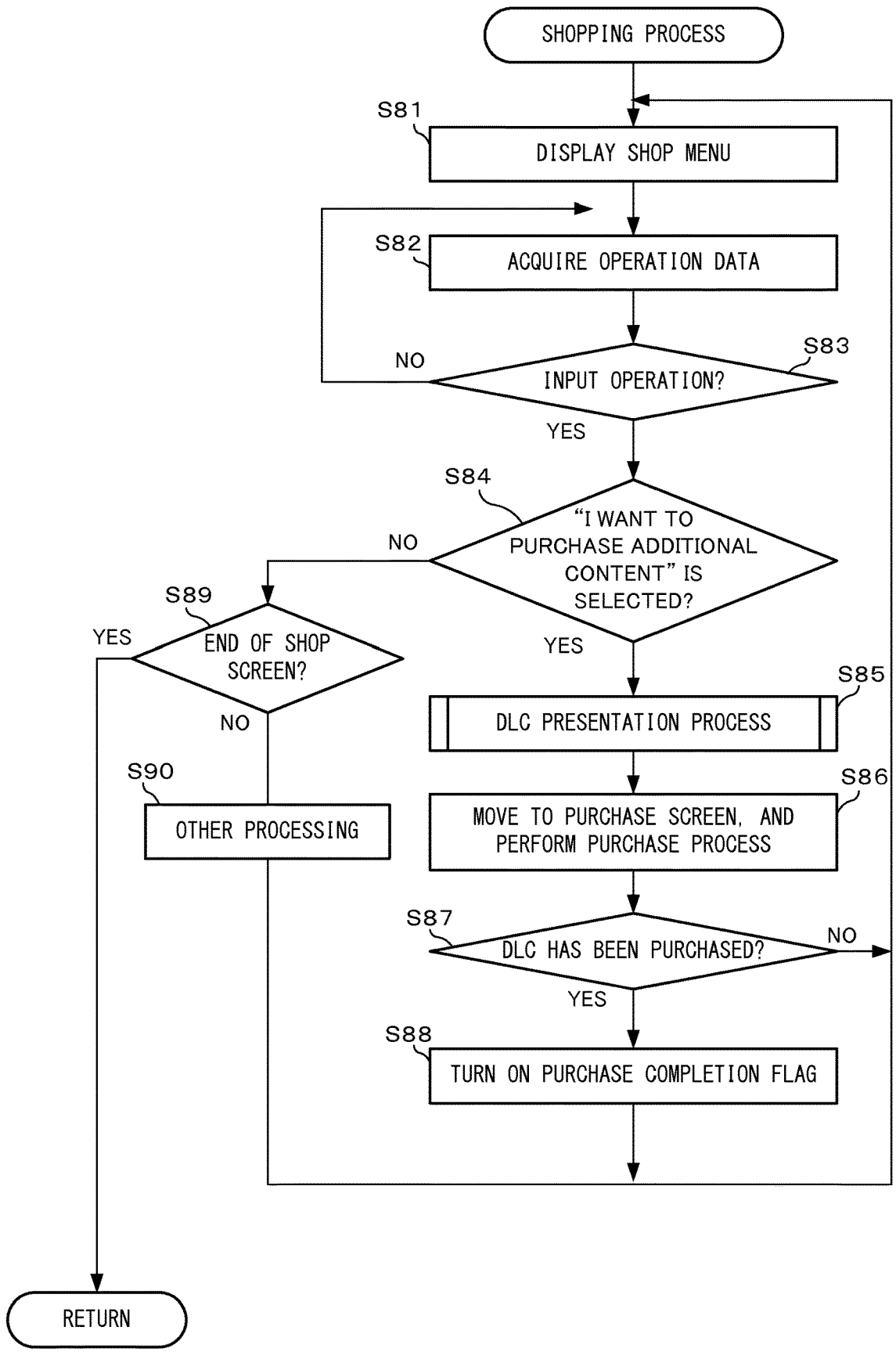
FIG. 19 is a flowchart showing, in detail, a shopping process in step S15 shown in FIG. 14.

FIG. 19 is a flowchart showing the detail of the shopping process. In FIG. 19, first, the processor 33 displays the shop menu (shop screen) as shown in FIG. 9 in step S81. If the DLC has not yet been purchased, the shop menu including the non-purchase mark 110 is displayed.

Next, in step S82, the processor 33 performs acquisition of the operation data 65, and determines, in step S83, based on the operation data 65, whether or not an input operation has been performed by the user. When the result of the determination is that no input operation has been performed (NO in step S83), the processor 33 returns to step S82 and repeats the processing. On the other hand, when an input operation has been performed (YES in step S83), the processor 33, in step S84, determines whether or not the content of the operation is selection of a button 111A indicating "I want to purchase additional content" (refer to FIG. 9). When the result of the determination is that the operation is selection of the "I want to purchase additional content" button 111A (YES in step S84), the processor 33, in step S85, executes the DLC presentation process described with reference to FIG. 16. In another embodiment, this process may be skipped if the "DLC presentation" has already been viewed.

Next, in step S86, the processor 33 executes the same purchase process as in step S33. Then, in the following step S87, the processor 33 determines whether or not the DLC has been purchased. When the DLC has been purchased (YES in step S87), the processor 33, in step S88, turns on the purchase completion flag 69. Then, the processor 33 returns to step S81. On the other hand, when the DLC has not been purchased (NO in step S87), the processor 33 returns to the process in step S81 without performing the process in step S88.

On the other hand, when the result of the determination in step S84 is that the operation is selection of an option other than the "I want to purchase additional content" button 111A (NO in step S84), the processor 33, in step S89, determines whether or not the operation is an instruction to end the shop screen. When the result of the determination is that the operation is not an instruction to end the shop screen (NO in step S89), the processor 33, in step S90, appropriately executes a process according to the content of the operation. Then, the processor 33 returns to the process in step S81. On the other hand, when the operation is an instruction to end the shop screen (YES in step S89), the processor 33 ends the shopping process.

Referring back to FIG. 14, next, in step S16, a process of switching information displayed on the upper LCD 22 is executed. FIG. 20 is a flowchart showing the detail of the display information switching process. With reference to FIG. 20, first, the processor 33 determines whether or not there is an unpurchased DLC with reference to the purchase completion flag 69, in step S16. When the result of the determination is that there is an unpurchased DLC (YES in step S101), the processor 33, in step S102, executes a process of appropriately switching between the "announcements" displayed on the upper LCD 22 so that the "announcement of additional DLC" is also displayed. On the other hand, when there is no unpurchased DLC (NO in step S101), the processor 33, in step S103, executes a process of appropriately displaying the "announcements" other than the "announcement of additional DLC" on the upper LCD 22. This is the end of the display information switching process.

Referring back to FIG. 14, next, in step S17, the processor 33 determines whether or not a condition for ending the golf game processing has been satisfied (e.g., whether or not an end instruction operation has been performed). When the result of the determination is that the condition has not been satisfied (NO in step S17), the processor 33 returns to step S10 and repeats the processing. When the condition has been satisfied (YES in step S17), the golf game processing is ended.

As described above, in the exemplary embodiment, regarding a certain DLC, presentations/notifications of different properties and purposes (multiple types of presentations/notifications) for the DLC are performed in a gradual manner for the user. Specifically, multiple kinds of presentations/notifications, such as the "first-notification dialog" (first presentation/notification), the "periodic reminder dialog" (second presentation/notification), and display of non-purchase mark 110 and the "announcement of additional DLC" (third presentation/notification), are performed in a gradual manner for the user. Thus, whether or not to purchase the DLC is left to the free will of the user, but at least the content of the DLC can be effectively notified to the user (the user is let to know the content of the DLC).

In another embodiment, the non-purchase mark 110 may not be displayed until the "DLC presentation" is viewed. That is, first, relatively strong appeal of the presence of the DLC is made to the user by using the "first-notification dialog" and the "periodic reminder dialog". While the "DLC presentation" has not yet been viewed by the user, the non-purchase mark 110 is not displayed. Thereafter, when the "DLC presentation" has been checked by the user and the DLC has not yet been purchased by the user, the non-purchase mark 110 may be displayed.

In another embodiment, display of the "announcement of additional DLC" on the upper LCD 22 may also not be performed until the "DLC presentation" has been viewed.

In another embodiment, regarding the time to delete the non-purchase mark 110, the non-purchase mark 110 may be deleted when the "DLC presentation" has been viewed. That is, the mark may be used not to indicate that a DLC has not been purchased but to indicate that there is DLC presentation that has not been viewed. Specifically, the mark 110 may be displayed while the "DLC presentation" has not been viewed by the user, and when the "DLC presentation" has been viewed, the mark may be deleted regardless of whether the DLC has been purchased. Also in this configuration, the purpose of urging the user to view the "DLC presentation" can be achieved.

In the above exemplary embodiment, the "first-notification dialog" and the "periodic reminder dialog" are used for exhibiting presence of "DLC presentation" and for inducing the user to check the "DLC presentation". In another embodiment, instead of presenting these dialogs, the following presentation method may be used. For example, indication indicating that a new DLC is released may be continuously displayed on the lower LCD 12 or the upper LCD 22 for a predetermined period of time, and a user operation may not be accepted during this indication. When the predetermined period has elapsed, the display may be deleted to display the main menu.

Further, for example, the content of the first-notification dialog 104 or the periodic reminder dialog 120 may be presented, not in the form of the dialog superimposed on the main menu as described above, but on the whole screen of the lower LCD 12 (full-screen display). Alternatively, the contents of these dialogs may be displayed on the whole screens of the upper LCD 22 and the lower LCD 12, respectively.

The display positions of the respective dialogs may be, for example, the right end and the left end of the screen (the size of each dialog may be appropriately adjusted).

Further, in the above exemplary embodiment, the non-purchase mark 110 is displayed when the DLC has not been purchased. That is, it is determined whether or not the DLC has been "purchased". In another embodiment, user actions other than "purchase" may be used as criteria. For example, if a DLC is free of charge, it may be determined whether or not the DLC is "downloaded". While the DLC is not yet downloaded, a display corresponding to the non-purchase mark 110 (a display indicating that there is a downloadable free content) may be performed.

The processes described in the exemplary embodiments are applicable not only to hand-held game apparatuses but also to stationary game apparatuses, mobile communication terminals such as smartphones, and information processing apparatuses such as so-called tablet terminals.

Further, the processes described in the exemplary embodiments are applicable not only to the golf game processing but also to other processing, for example, other game processing, and educational software and business software.

In the exemplary embodiments described above, a series of processes for presenting/notifying information relating to a DLC to a user is performed in a single information processing apparatus (hand-held game apparatus). In another embodiment, the series of processes may be performed in an information processing system that includes a plurality of information processing apparatuses. For example, in an information processing system that includes a terminal side apparatus and a server side apparatus capable of communicating with the terminal side apparatus via a network, a part of the series of processes may be performed by the server side apparatus. Alternatively, in an information processing system that includes a terminal side apparatus and a server side apparatus capable of communicating with the terminal side apparatus via a network, a main process of the series of the processes may be performed by the server side apparatus, and a part of the series of the processes may be performed by the terminal side apparatus. Still alternatively, in the information processing system, a server side system may include a plurality of information processing apparatuses, and a process to be performed in the server side system may be divided and performed by the plurality of information processing apparatuses.

What is claimed is:

1. A computer-readable non-transitory storage medium having stored therein an information processing program to be executed by a computer of an information processing apparatus which provides notifications relating to information distributed from a server, the information processing program, when executed, causing the computer to control the information processing apparatus to:

after starting execution of an application, determine whether presentation target information including information about content for the application has been received from the server;

receive an input to start performing operations in the application;

after receiving the input to start performing operations in the application and determining that the presentation target information has not been received, perform the operations;

after receiving the input to start performing operations in the application and determining that the presentation target information has been received, impede processing of the operations in the application and display a first notification simultaneously displaying a first selection option to display the received presentation target information and a second selection option to stop displaying the first notification;

after the first notification has been displayed and based on the received presentation target information not having been displayed, impede processing of the operations in the application and display a second notification, different from the first notification, periodically or according to a time schedule, the second notification simultaneously displaying a third selection option to display the received presentation target information and a fourth selection option to stop displaying the second notification;

display the received presentation target information when the first or third selection option to display the received presentation target information is selected in response to the first notification or the second notification; and after displaying the received presentation target information, display a screen for obtaining the content for the application, wherein the first notification is continuously displayed until an input operation to the first or second selection option is received, and the first notification is deleted when the input operation to the first or second selection option is received, and the second notification is continuously displayed until an input operation to the third or fourth selection option is received, and the second notification is deleted when the input operation to the third or fourth selection option is received.

2. The computer-readable non-transitory storage medium having stored therein the information processing program according to claim 1, wherein the information processing program, when executed, further causes the computer to control the information processing apparatus to:

after selection of the second selection option or the fourth selection option, processing of the operations in the application is continued.

3. The computer-readable non-transitory storage medium having stored therein the information processing program according to claim 1, wherein the first notification and the second notification are superimposed on a screen content relating to processing executed by the application.

4. The computer-readable non-transitory storage medium having stored therein the information processing program according to claim 1, wherein the processing of the operations in the application is impeded until an input operation to the first notification is performed, while the first notification is displayed.

5. The computer-readable non-transitory storage medium having stored therein the information processing program according to claim 1, wherein
display positions of the first notification and the second notification are in the center of a screen.

6. The computer-readable non-transitory storage medium having stored therein the information processing program according to claim 1, wherein
the received presentation target information is information for explaining, in detail, the content that is purchasable for the application, and
the program, when executed, further causes the computer to control the information processing apparatus to, subsequently to the process of displaying the received presentation target information, display a screen for purchase of the purchasable content, and execute a process for purchase of the content based on a user operation.

7. The computer-readable non-transitory storage medium having stored therein the information processing program according to claim 1, wherein
the information processing program, when executed, further causes the computer to control the information processing apparatus to display a third notification indicating that a predetermined process, based on a user operation, is possible to the content corresponding to the received presentation target information, and
the third notification is displayed after the received presentation target information is displayed.

8. The computer-readable non-transitory storage medium having stored therein the information processing program according to claim 7, wherein
the third notification is displayed in a display mode in which advance of processing being executed is not impeded.

9. The computer-readable non-transitory storage medium having stored therein the information processing program according to claim 8, wherein
the third notification is displayed in a display mode in which display content other than the third notification is not impeded by display of the third notification.

10. The computer-readable non-transitory storage medium having stored therein the information processing program according to claim 8, wherein
the third notification is notification that does not include a request for an input operation of the user to the notification.

11. The computer-readable non-transitory storage medium having stored therein the information processing program according to claim 8, wherein
the information processing program, when executed, further causes the computer to control the information processing apparatus to execute processing allowing a user to perform an operation even when the third notification is displayed.

12. The computer-readable non-transitory storage medium having stored therein the information processing program according to claim 7, wherein
the presentation target information is information for explaining, in detail, the content that is purchasable for the application, and
the third notification is displayed while the content has not been purchased, and is not displayed after the content has been purchased.

13. An information processing apparatus which provides notifications relating to information distributed from a server, comprising:
a processing system, including at least one processor, the processing system configured to:
after starting execution of an application, determine whether presentation target information including information about content for the application has been received from the server;
receive an input to start performing operations in the application;
after receiving the input to start performing operations in the application and determining that the presentation target information has not been received, perform the operations;
after receiving the input to start performing operations in the application and determining that the presentation target information has been received, impede processing of the operations in the application and display a first notification simultaneously displaying a first selection option to display the received presentation target information and a second selection option to stop displaying the first notification;
after the first notification has been displayed and based on the received presentation target information not having been displayed, impede processing of the operations in the application and display a second notification, different from the first notification, periodically or according to a time schedule, the second notification simultaneously displaying a third selection option to display the received presentation target information and a fourth selection option to stop displaying the second notification;
display the received presentation target information when the first or third selection option to display the received presentation target information is selected in response to the first notification or the second notification; and after displaying the received presentation target information, display a screen for obtaining the content for the application, wherein
the first notification is continuously displayed until an input operation to the first or second selection option is received, and the first notification is deleted when the input operation to the first or second selection option is received, and
the second notification is continuously displayed until an input operation to the third or fourth selection option is received, and the second notification is deleted when the input operation to the third or fourth selection option is received.

14. An information processing system which provides notifications relating to information distributed from a server, comprising:
a display;
a receiver configured to receive, from the server, presentation target information;
a processing circuitry, including at least one processor, the processing circuitry configured to:
after starting execution of an application, determine whether presentation target information including information about content for the application has been received from the server;
receive an input to start performing operations in the application;
after receiving the input to start performing operations in the application and determining that the presentation target information has not been received, perform the operations;
after receiving the input to start performing operations in the application and determining that the presentation target information has been received, impede processing of the operations in the application and display, on the display, a first notification simultaneously displaying a first selection option to display the received presentation target information and a second selection option to stop displaying the first notification;

after the first notification has been displayed and based on the received presentation target information not having been displayed, impede processing of the operations in the application and display, on the display, a second notification, different from the first notification, periodically or according to a time schedule, the second notification simultaneously displaying a third selection option to display the received presentation target information and a fourth selection option to stop displaying the second notification;

display, on the display, the received presentation target information when the first or third selection option to display the received presentation target information is selected in response to the first notification or the second notification; and after displaying the received presentation target information, display a screen for obtaining the content for the application, wherein the first notification is continuously displayed until an input operation to the first or second selection option is received, and the first notification is deleted when the input operation to the first or second selection option is received, and the second notification is continuously displayed until an input operation to the third or fourth selection option is received, and the second notification is deleted when the input operation to the third or fourth selection option is received.

15. An information processing method for controlling an information processing apparatus which provides notifications relating to information distributed from a server, the method comprising:

after starting execution of an application, determining whether presentation target information including information about content for the application has been received from the server;

receiving an input to start performing operations in the application;

after receiving the input to start performing operations in the application and determining that the presentation target information has not been received, performing the operations;

after receiving the input to start performing operations in the application and determining that the presentation target information has been received, impeding processing of the operations in the application and displaying a first notification simultaneously displaying a first selection option to display the received presentation target information and a second selection option to stop displaying the first notification;

after the first notification has been displayed and based on the received presentation target information not having been displayed, impede processing of the operations in the application and displaying a second notification, different from the first notification, periodically or according to a time schedule, the second notification simultaneously displaying a third selection option to display the received presentation target information and a fourth selection option to stop displaying the second notification;

displaying the received presentation target information when the first or third selection option to display the received presentation target information is selected in response to the first notification or the second notification; and after displaying the received presentation target information, displaying a screen for obtaining the content for the application, wherein the first notification is continuously displayed until an input operation to the first or second selection option is received, and the first notification is deleted when the input operation to the first or second selection option is received, and the second notification is continuously displayed until an input operation to the third or fourth selection option is received, and the second notification is deleted when the input operation to the third or fourth selection option is received.

16. The information processing system of claim 14, wherein the application is a game application, and the first notification and the second notification are displayed within the game application.

17. The information processing system of claim 14, wherein the first notification and the second notification are displayed within the application.

18. The information processing system of claim 14, wherein the received presentation target information is a movie.

19. The information processing system of claim 18, wherein the processing circuitry is further configured to, when playback of the movie is ended, automatically display, on the display, a page for purchase of the content.

20. The information processing system of claim 14, wherein the first notification is displayed on the whole screen of the display.

21. The information processing apparatus of claim 13, wherein the application is a game application, and the content is a downloadable content providing additional features in the game application.

22. The information processing apparatus of claim 13, wherein the information processing apparatus further comprises storage, and the processing system is further configured to:

before execution of the application is started, store the presentation target information received from the server in the storage; and after starting execution of an application, copy the stored presentation target information into memory storing application data of the executed application and delete the presentation target information stored in the storage.

23. The computer-readable non-transitory storage medium having stored therein the information processing program according to claim 1, wherein the received presentation target information includes a moving picture.

24. The computer-readable non-transitory storage medium having stored therein the information processing program according to claim 1, wherein the information processing program, when executed, further causes the computer to control the information processing apparatus to, display a third notification after the received presentation target information is displayed, the third notification indicating that the content for the application can be obtained.

* * * * *